US008065411B2

(12) United States Patent
Spiess et al.

(10) Patent No.: US 8,065,411 B2
(45) Date of Patent: Nov. 22, 2011

(54) SYSTEM MONITOR FOR NETWORKS OF NODES

(75) Inventors: Patrik Spiess, Karlsruhe (DE); Luciana Moreira Sa de Souza, Karlsruhe (DE); Stephan Haller, Karlsruhe (DE); Zoltan Nochta, Karlsruhe (DE)

(73) Assignee: SAP AG, Walldorf (DE)

( * ) Notice: Subject to any disclaimer, the term of this patent is extended or adjusted under 35 U.S.C. 154(b) by 1088 days.

(21) Appl. No.: 11/444,119

(22) Filed: May 31, 2006

(65) Prior Publication Data

US 2007/0283001 A1 Dec. 6, 2007

(51) Int. Cl.
G06F 3/00 (2006.01)
G06F 7/00 (2006.01)
G08B 1/08 (2006.01)

(52) U.S. Cl. .......... 709/224; 709/231; 709/233; 707/10

(58) Field of Classification Search .......... 709/223–226, 709/231, 233
See application file for complete search history.

(56) References Cited

U.S. PATENT DOCUMENTS

| | | | |
|---|---|---|---|
| 5,740,357 A | 4/1998 | Gardiner et al. | |
| 5,768,568 A | 6/1998 | Inui et al. | |
| 5,805,820 A | 9/1998 | Bellovin et al. | |
| 5,809,012 A | 9/1998 | Takase et al. | |
| 5,940,593 A | 8/1999 | House et al. | |
| 5,991,806 A | 11/1999 | McHann, Jr. | |
| 6,009,431 A | 12/1999 | Anger et al. | |
| 6,016,499 A | 1/2000 | Ferguson | |
| 6,023,702 A | 2/2000 | Leisten et al. | |
| 6,065,052 A | 5/2000 | Van | |
| 6,138,162 A * | 10/2000 | Pistriotto et al. | 709/229 |
| 6,167,438 A | 12/2000 | Yates et al. | |
| 6,178,173 B1 | 1/2001 | Mundwiler et al. | |
| 6,184,778 B1 | 2/2001 | Tsuji | |
| 6,189,038 B1 * | 2/2001 | Thompson et al. | 709/231 |
| 6,199,195 B1 | 3/2001 | Goodwin et al. | |
| 6,226,788 B1 | 5/2001 | Schoening et al. | |
| 6,256,739 B1 | 7/2001 | Skopp et al. | |

(Continued)

FOREIGN PATENT DOCUMENTS

EP 0697654 A1 2/1996

(Continued)

OTHER PUBLICATIONS

Carvalho, H et al., "A General Data Fusion Architecture", Proceedings of the 6th International Conference on Information Fusion (Jul. 2003), pp. 1-8.

(Continued)

Primary Examiner — Ian N Moore
Assistant Examiner — Thai N Nguyen
(74) Attorney, Agent, or Firm — Brake Hughes Bellermann LLP

(57) ABSTRACT

Systems and methods are described that provide a system monitor component, e.g., for a sensor network, which may include, e.g., a server component that is continuously running and monitoring zero or more networks consisting of (possibly wireless) devices, where each network may be executing a different communications protocol, such as a proprietary, platform-dependent protocol. The system monitor may maintain a system model of the networks. The system monitor may be connected with the networks through a message transport system that routes any occurring messages in a common or standard communications protocol, as well as message handlers that access either platform-abstracting gateways or the proprietary messages that the devices of one or more of the networks may use.

18 Claims, 7 Drawing Sheets

U.S. PATENT DOCUMENTS

| | | | |
|---|---|---|---|
| 6,262,726 B1 | 7/2001 | Stedman et al. | |
| 6,292,856 B1 | 9/2001 | Marcotte | |
| 6,308,178 B1 | 10/2001 | Chang et al. | |
| 6,343,287 B1 | 1/2002 | Kumar et al. | |
| 6,363,411 B1 | 3/2002 | Dugan et al. | |
| 6,442,748 B1 | 8/2002 | Bowman-Amuah | |
| 6,460,082 B1 | 10/2002 | Lumelsky et al. | |
| 6,480,977 B1 * | 11/2002 | Apisdorf et al. | 714/712 |
| 6,567,411 B2 | 5/2003 | Dahlen | |
| 6,606,740 B1 | 8/2003 | Lynn et al. | |
| 6,643,669 B1 | 11/2003 | Novak et al. | |
| 6,654,953 B1 | 11/2003 | Beaumont et al. | |
| 6,687,846 B1 | 2/2004 | Adrangi et al. | |
| 6,694,335 B1 | 2/2004 | Hopmann et al. | |
| 6,757,720 B1 | 6/2004 | Weschler | |
| 6,785,707 B2 | 8/2004 | Teeple | |
| 6,789,114 B1 | 9/2004 | Garg et al. | |
| 6,832,373 B2 | 12/2004 | O'Neill | |
| 6,842,903 B1 | 1/2005 | Weschler | |
| 6,859,831 B1 * | 2/2005 | Gelvin et al. | 709/224 |
| 6,891,823 B1 * | 5/2005 | Schwartz et al. | 370/351 |
| 6,892,236 B1 | 5/2005 | Conrad et al. | |
| 6,927,686 B2 | 8/2005 | Nieters et al. | |
| 6,980,993 B2 | 12/2005 | Horvitz et al. | |
| 6,986,148 B2 | 1/2006 | Johnson et al. | |
| 7,024,430 B1 | 4/2006 | Ingraham et al. | |
| 7,043,419 B2 | 5/2006 | Chess et al. | |
| 7,072,960 B2 | 7/2006 | Graupner et al. | |
| 7,075,960 B2 | 7/2006 | Kohara et al. | |
| 7,096,461 B1 | 8/2006 | Nakamura et al. | |
| 7,099,946 B2 | 8/2006 | Lennon et al. | |
| 7,116,674 B2 | 10/2006 | Shi | |
| 7,130,773 B1 | 10/2006 | Wong | |
| 7,152,019 B2 | 12/2006 | Tarantola et al. | |
| 7,171,471 B1 | 1/2007 | Nair | |
| 7,227,889 B1 | 6/2007 | Roeck et al. | |
| 7,237,243 B2 | 6/2007 | Sutton et al. | |
| 7,286,158 B1 | 10/2007 | Griebenow | |
| 7,302,401 B1 | 11/2007 | Tervonen | |
| 7,304,976 B2 | 12/2007 | Mao et al. | |
| 7,312,703 B2 | 12/2007 | Hoogenboom | |
| 7,313,467 B2 | 12/2007 | Breed et al. | |
| 7,382,741 B2 | 6/2008 | Rao | |
| 7,413,513 B2 | 8/2008 | Nguyen et al. | |
| 7,467,018 B1 | 12/2008 | Callaghan | |
| 7,506,338 B2 | 3/2009 | Alpern et al. | |
| 7,584,471 B2 | 9/2009 | Bjaere et al. | |
| 7,616,642 B2 | 11/2009 | Anke et al. | |
| 7,752,068 B1 | 7/2010 | Micklavzina et al. | |
| 7,756,969 B1 | 7/2010 | Clarke et al. | |
| 7,853,946 B2 | 12/2010 | Minagawa | |
| 7,860,968 B2 | 12/2010 | Bornhoevd et al. | |
| 7,890,568 B2 | 2/2011 | Belenki | |
| 7,930,143 B2 | 4/2011 | Tarantola et al. | |
| 2002/0004828 A1 | 1/2002 | Davis et al. | |
| 2002/0007422 A1 | 1/2002 | Bennett | |
| 2002/0100036 A1 | 7/2002 | Moshir et al. | |
| 2002/0105915 A1 * | 8/2002 | Hamada | 370/252 |
| 2002/0161751 A1 | 10/2002 | Mulgund et al. | |
| 2002/0174169 A1 | 11/2002 | Schmid | |
| 2002/0184103 A1 | 12/2002 | Shah et al. | |
| 2002/0188866 A1 | 12/2002 | Ca et al. | |
| 2002/0194181 A1 | 12/2002 | Wachtel | |
| 2002/0199173 A1 | 12/2002 | Bowen | |
| 2003/0005350 A1 | 1/2003 | Koning et al. | |
| 2003/0016664 A1 | 1/2003 | MeLampy et al. | |
| 2003/0050902 A1 | 3/2003 | Buczak et al. | |
| 2003/0078946 A1 | 4/2003 | Costello et al. | |
| 2003/0097443 A1 | 5/2003 | Gillett et al. | |
| 2003/0152041 A1 | 8/2003 | Herrmann et al. | |
| 2003/0167406 A1 | 9/2003 | Beavers | |
| 2003/0217186 A1 | 11/2003 | Bushey | |
| 2003/0223746 A1 * | 12/2003 | Belhadj-Yahya et al. | 398/27 |
| 2003/0228910 A1 | 12/2003 | Jawaharlal et al. | |
| 2004/0024768 A1 | 2/2004 | Haller | |
| 2004/0088231 A1 | 5/2004 | Davis, Jr. | |
| 2004/0111499 A1 | 6/2004 | Dobrowski et al. | |
| 2004/0121792 A1 * | 6/2004 | Allen et al. | 455/519 |
| 2004/0166807 A1 | 8/2004 | Vesikivi et al. | |
| 2004/0181541 A1 * | 9/2004 | Groenendaal et al. | 707/100 |
| 2004/0193703 A1 | 9/2004 | Loewy et al. | |
| 2004/0199804 A1 | 10/2004 | Rathunde et al. | |
| 2004/0220910 A1 | 11/2004 | Zang et al. | |
| 2004/0243352 A1 | 12/2004 | Morozumi et al. | |
| 2004/0249944 A1 | 12/2004 | Hosking et al. | |
| 2004/0250113 A1 | 12/2004 | Beck | |
| 2005/0060365 A1 | 3/2005 | Robinson et al. | |
| 2005/0071443 A1 | 3/2005 | Menon et al. | |
| 2005/0080892 A1 | 4/2005 | Moser et al. | |
| 2005/0114431 A1 | 5/2005 | Singh et al. | |
| 2005/0183061 A1 | 8/2005 | Papanikolaou et al. | |
| 2005/0198228 A1 | 9/2005 | Bajwa et al. | |
| 2005/0228763 A1 | 10/2005 | Lewis et al. | |
| 2005/0235058 A1 * | 10/2005 | Rackus et al. | 709/224 |
| 2005/0235136 A1 | 10/2005 | Barsotti et al. | |
| 2006/0022801 A1 * | 2/2006 | Husak et al. | 340/10.5 |
| 2006/0026301 A1 | 2/2006 | Maeda et al. | |
| 2006/0026591 A1 | 2/2006 | Backhouse et al. | |
| 2006/0029054 A1 | 2/2006 | Breh et al. | |
| 2006/0031447 A1 | 2/2006 | Holt et al. | |
| 2006/0047545 A1 | 3/2006 | Kumar et al. | |
| 2006/0052882 A1 | 3/2006 | Kubach et al. | |
| 2006/0074912 A1 | 4/2006 | Borthakur et al. | |
| 2006/0085798 A1 | 4/2006 | Bendiksen et al. | |
| 2006/0106581 A1 | 5/2006 | Bornhoevd et al. | |
| 2006/0107284 A1 | 5/2006 | Crawford et al. | |
| 2006/0129367 A1 | 6/2006 | Mishra et al. | |
| 2006/0143592 A1 | 6/2006 | Bender et al. | |
| 2006/0146991 A1 | 7/2006 | Thompson et al. | |
| 2006/0173726 A1 | 8/2006 | Hall et al. | |
| 2006/0206582 A1 | 9/2006 | Finn | |
| 2006/0212453 A1 | 9/2006 | Eshel et al. | |
| 2006/0212698 A1 | 9/2006 | Peckover | |
| 2006/0225064 A1 | 10/2006 | Lee et al. | |
| 2006/0235976 A1 | 10/2006 | Chen et al. | |
| 2006/0265661 A1 | 11/2006 | Ball | |
| 2006/0277079 A1 | 12/2006 | Gilligan et al. | |
| 2007/0011334 A1 | 1/2007 | Higgins et al. | |
| 2007/0032244 A1 | 2/2007 | Counts et al. | |
| 2007/0112574 A1 | 5/2007 | Greene | |
| 2007/0118496 A1 | 5/2007 | Bornhoevd et al. | |
| 2007/0118549 A1 | 5/2007 | Bornhoevd et al. | |
| 2007/0118560 A1 | 5/2007 | Bornhoevd et al. | |
| 2007/0130208 A1 | 6/2007 | Bornhoevd et al. | |
| 2007/0130217 A1 | 6/2007 | Linyard et al. | |
| 2007/0168690 A1 | 7/2007 | Ross | |
| 2007/0168919 A1 | 7/2007 | Henseler et al. | |
| 2007/0168925 A1 | 7/2007 | Bornhoevd et al. | |
| 2007/0204261 A1 | 8/2007 | Fetzer et al. | |
| 2007/0210916 A1 | 9/2007 | Ogushi et al. | |
| 2007/0233881 A1 | 10/2007 | Nochta et al. | |
| 2007/0251998 A1 | 11/2007 | Belenki | |
| 2007/0276619 A1 | 11/2007 | Sugahara et al. | |
| 2007/0276674 A1 | 11/2007 | Hemmat | |
| 2007/0282746 A1 | 12/2007 | Anke et al. | |
| 2007/0282988 A1 | 12/2007 | Bornhoevd et al. | |
| 2007/0283001 A1 | 12/2007 | Spiess et al. | |
| 2007/0283002 A1 | 12/2007 | Bornhoevd et al. | |
| 2008/0010284 A1 | 1/2008 | Beck | |
| 2008/0021976 A1 | 1/2008 | Chen et al. | |
| 2008/0028068 A1 | 1/2008 | Nochta et al. | |
| 2008/0033785 A1 | 2/2008 | Anke | |
| 2008/0052314 A1 | 2/2008 | Batabyal | |
| 2008/0270486 A1 | 10/2008 | Hind et al. | |
| 2008/0306798 A1 | 12/2008 | Anke et al. | |
| 2009/0097397 A1 | 4/2009 | Moreira | |
| 2010/0122236 A1 | 5/2010 | Bugir et al. | |

FOREIGN PATENT DOCUMENTS

| | | |
|---|---|---|
| EP | 1372073 A2 | 12/2003 |
| EP | 1788480 A2 | 5/2007 |
| EP | 1863223 A1 | 12/2007 |
| EP | 1892656 A1 | 2/2008 |
| JP | 2004110318 A2 | 4/2004 |
| WO | 2005106666 A1 | 11/2005 |

OTHER PUBLICATIONS

Hawick, K A., et al., "Middleware for Wireless Sensors and Robots", DHPC Technical Report DHPC-112 (Aug. 18, 2002), pp. 1-6.
European Search Report for Application No. EP07005127.1, mailed Jul. 20, 2007, pp. 1-3.
European Search Report for Application No. EP07008409.0, mailed Aug. 24, 2007, pp. 1-4.
European Search Report for Application No. EP07009428.9, mailed Oct. 4, 2007, pp. 1-4.
European Search Report for Application No. EP07014724.4, mailed Nov. 27, 2007, pp. 1-4.
European Search Report for Application No. EP06023720.3, mailed Apr. 10, 2007, pp. 1-4.
European Seach Report for Application No. EP06023256.8, mailed May 9, 2007, pp. 1-5.
Decasper, D. et al., "Router Plugins: A Software Architecture For Next Generation Routers", Computer Communication Review (Oct. 1998), pp. 229-240.
Bornhoevd, Christof et al., "Integrating Smart Items with Business Processes: An Experience Report", HICSS '05: Proceedings of the 38th Annual Hawaii International Conference on System Sciences—Track 8 (2005), 8 pgs.
Final Office Action mailed Jun. 25, 2008 for U.S. Appl. No. 11/284,195, 31 pgs.
Final Office Action mailed Feb. 23, 2009 for U.S. Appl. No. 11/479,284, 29 pgs.
Non-Final Office Action mailed May 14, 2008 for U.S. Appl. No. 11/479,284, 16 pgs.
Non-Final Office Action mailed Nov. 1, 2007 for U.S. Appl. No. 11/284,195, 14 pgs.
Advisory Action mailed Oct. 9, 2008 for U.S. Appl. No. 11/284,195, 4 pgs.
Extended European Search Report for Application No. 08017795.9, mailed Feb. 10, 2009, 11 pgs.
"FAQ: Fault management—How does Fault Management Work?" 2000, 9 pgs.
Spiess, P., et al, "Deliverable 401: Management & Maintenence Requirements", Version 1.0 (Jan. 2005), 21 pgs.
Non-Final Office Action mailed Oct. 28, 2008 for U.S. Appl. No. 11/283,618, 35 pgs.
Final Office Action mailed May 13, 2009 for U.S. Appl. No. 11/283,618, 32 pgs.
Chatterjee, Mainak et al., "WCA: A Weighted Clustering Alogrithm for Mobile Ad Hoc Networks", Cluster Computing 5, Klluwer Academic Publishers, 2002, pp. 193-204.
Greenstein, Ben et al., "A Sensor Network Application Construction Kit (SNACK)", SenSys '04, Nov. 3-5, 2004, 12 pages.
"The OSGi Service Platform—Dynamic services for networked devices", Retrieved Nov. 16, 2005 from http://www.osgi.org/osgi_technology/index.asp?section=2, 5 pgs.
"TINYOS: Mission Statement", Retrieved Nov. 16, 2005 from http://www.tinyos.net/special/mission, 2 pgs.
Bandara, Ayomi et al., "An Ontological Framework for Semantic Description of Devices", Nov. 11, 2004, 2 pgs.
Vasudevan, Sudarshan et al., "Design and Analysis of a Leader Election Algorithm for Mobile Ad Hoc Networks", Proceedings of 12th IEEE ICNP, Oct. 8, 2004, 11 pages.
Liu, Jinshan et al., "QoS-aware Service Location in Mobile Ad-Hoc Networks", Proceedings of the 5th International Conference on Mobile Data Management, Berkeley, CA USA, Jan. 2004, 12 pages.
Liu, Jinshan et al., "Group Management for Mobile Ad Hoc Networks: Design, Implementation and Experiment", Proceedings of the 6th International Conference on Mobile Data Management, Ayia Napa Cyprus, May 13, 2005, 8 pages.
Gounaris, Anastasios et al., "Adaptive Query Processing: A Survey", Lecture Notes In Computer Science, vol. 2405, Archive of Proceedings of the 19th British National Conference on Databases: Advances in Databases, 2002, pp. 11-25.
Skouteli, Chara et al., "Concept-Based Discovery of Mobile Services", Proceedings of the 6th International Conference on Mobile Data Management, Ayia Napa Cyprus, May 13, 2005, 5 pages.

Yao, Yong et al., "Query Processing for Sensor Networks", Proceedings of the 2003 CIDR Conference, Jan. 2003, 12 pages.
Bornhoevd, Christof et al., "Integrating Automatic Data Acquisition with Business Processes Experiences with SAP's Auto-ID Infrastructure", Proceedings of the 30th VLDB Conference, Oct. 8, 2004, 7 pages.
Spiess, Patrik et al., "Going Beyond Auto-ID: A Service-oriented Smart Items Infrastructure", Journal of Enterprise Information Management, vol. 20, Issue 3 (2007), pp. 1-9.
"Composite Capability/Preference Profiles (CC/PP): Structure and Vocabularies 1.0", W3C Recommendation (Jan. 15, 2004), pp. 1-78.
"FIPA Device Ontology Specification", Foundation for Intelligent Physical Agents (Apr. 9, 2001), pp. 1-15.
Levis, Philip et al., "TinyOS: An Operating System for Sensor Networks", Feb. 17, 2004, pp. 1-32.
Hill, Jason Lester, "System Architecture for Wireless Sensor Networks", Dissertation of Jason Lester Hill, University of California, Berkeley, 2003, 196 pages.
Bellavista, Paolo et al., "The Ubiquitous Provisioning of Internet Services to Portable Devices", Pervasive Computing, Jul. 2002, pp. 81-87.
"MVP Brochure", Bitfone Corporation (2005), www.bitfone.com/usa/uploads/mvp.brochure (Retrieved Sep. 20, 2005), pp. 1-3.
Domagalski, Ronald et al., "Moglichkeiten der Anfragebearbeitung in mobilen Ad-hoc-Netzwerken", English Title: Possibilties of Query Processing in Mobile Ad Hoc Networks, Contribution to the Workshop "Applications of Mobile Information Technology", Heidelburg German, Full length English translation included, Mar. 23-24, 2004, 12 pages.
Kotov, Vadim et al., "Optimization of E-Service Solutions with the Systems of Servers Library", 8th International Symposium on Modeling, Analysis and Simulation of Computer and Telecommunication Systems (Apr. 2000), pp. 575-582.
Foster, I. et al., "The Open Grid Services Architecture, Version 1.0", Informational Document, Global Frid Forum (Jan. 29, 2005), pp. 1-62.
Baker, M. et al., "Grids and Grid Technologies for wide-area Distributed Computing", Software—Practice & Experience (Sep. 27, 2002), pp. 1437-1466.
Mikic-Rakic, M et al., "Improving availability in large, distributed component-based systems via redeployment", LNCS, vol. 3798 (Nov. 3, 2005), 15 pgs.
Malek, S et al., "A decentralized redeployment algorithm for improving the availability of distributed systems", LNCS, vol. 3798 (Nov. 3, 2005), 13 pgs.
Hoareau, D et al., "Constraint-Based Deployment of Distributed Components in a Dynamic Network", LNCS, vol. 3894 (Mar. 16, 2006), pp. 450-464.
"RFID White Paper Technology, System, and Applications", BITKOM, An Overview for companies seeking to use RFID technology to connect their IT systems directly to the "real" world, German Association for Information Technology Telecommunications and New Media E.V., (Dec. 12, 2005), pp. 1-50.
Mikic-Rakic, M et al., "A tailorable environment for assessing the quality of deployment architectures in highly distributed settings", Second International Working Conference on Component Deployment (2004), pp. 1-15.
Ploennigs, J et al., "A traffic model for networked devices in the building automation", In: Proceedings of the 5th IEEE International Workshop on Factory Communication Systems (WFCS 2004), Vienna, Austria, (2004), pp. 137-145.
Wu, Q et al., "Adaptive component allocation in scudware middleware for ubiquitous computing", LNCS, vol. 3824 (Dec. 6, 2005), pp. 1155-1164.
Wegdam, M et al., "Dynamic reconfiguration and load distribution in component middleware", PhD thesis, University of Twente, Enschede, (2003), pp. 1-257.
Colt, Charles et al., "Oracle Â® Collaboration Suite, Deployment Guide10g Release 1 (10.1.1) B14479-02", (Oct. 2005), pp. 1-230.
Malek, S et al., "A style-aware architectural middleware for resource-constrained,distributed systems", IEEE Transactions on Software Engineering, vol. 31, Issue 3 (Mar. 2005), pp. 256-272.

Lacour, S et al., "A Software Architecture for Automatic Deployment of CORBA Components Using Grid Technologies", Networking and Internet Architecture, DECOR04 (Nov. 24, 2004), pp. 187-192.

Kichkaylo, T et al., "Constrained Component Deployment in Wide-Area Networks Using AI Planning Techniques", Proceedings of the 17th International Symposium on Parallel and Distributed Processing 2003), pp. 1-10.

Akehurst, D H., et al., "Design Support for Distributed Systems: DSE4DS", Procedings of the 7th Cabernet Radicals Workshop (Oct. 2002), pp. 1-6.

Kichkaylo, T et al., "Optimal Resource-Aware Deployment Planning for Component-Based Distributed Applications", HPDC '04: Proceedings of the 13th IEEE International Symposium on High Performance Distributed Computing (HPDC '04), IEEE Computer Society (2004), pp. 150-159.

Wu, X et al., "Performance modeling from software components", ACM SIGSOFT Software Engineering Notes, vol. 29, Issue 1 (Jan. 2004), pp. 290-301.

Stewart, C et al., "Profile driven Component Placement for Cluster-based Online Services", IEEE Distributed Systems Online, vol. 5, No. 10, (Oct. 2004), p. 1-6.

Basile, Claudio et al., "A Survey of Dependability Issues in Mobile Wireless Networks", Technical Report, LAAS CNRS Toulouse (Feb. 21, 2003), pp. 1-45.

Buchholz, Sven et al., "Adaptation-Aware Web Caching: Caching in the Future Pervasive Web", In: KiVS, (2003), pp. 55-66.

Carzaniga, Antonio et al., "Designing distributed applications with mobile code paradigms", In: Proceedings of the 19th International Conference on Software Engineering, Boston, Massachusetts, (1997), pp. 22-32.

Chandra, Bharat et al., "Resource management for scalable disconnected access to web services", WWW '01: Proceedings of the 10th International Conference on World Wide Web (May 5, 2001), pp. 245-256.

ETSI, "Selection procedures for the choice of radio transmission technologies of the UMTS", Universal Mobile Telecommunications System 30.03 version 3.2.0 (Apr. 1998), pp. 1-84.

Fredriksson, Johan et al., "Calculating Resource Trade-offs when Mapping Component Services to Real-Time Tasks", Fourth Conference on Software Engineering Research and Practice (Oct. 2004), pp. 1-8.

Hasiotis, Tilemahos et al., "Sensation: A Middleware Integration Platform for Pervasive Applications in Wireless Sensor Networks", Proceedings of the 2nd European Workshop on Wireless Sensor Networks (Jan. 31, 2005), pp. 1-13.

Sgroi, Marco et al., "A Service-Based Universal Application Interface for Ad-hoc Wireless Sensor Networks", Preliminary Draft (Nov. 26, 2003), pp. 1-39.

Srivastava, Utkarsh et al., "Operator Placement for In-Network Stream Query Processing", Proceedings of the 24th ACM SIGMOD-SIGACT-SIGART Symposium on Principles of Database Systems (Dec. 2004), pp. 1-10.

Vigna, Giovanni "Mobile Code Technologies, Paradigms, and Applications", PhD Thesis, Politecnico di Milano, Milano, Italy, (1998), pp. 1-89.

Buschmann, C et al., "Towards Information Centric Application Development for Wireless Sensor Networks", In Proceedings of the System Support for Ubiquitous Computing Workshop (UbiSys) at the Sixth Annual Conference on Ubiquitous Computing (UbiComp 2004), pp. 1-12.

Overeinder, B. et al., "A Dynamic load balancing system for parallel cluster computing", Future Generations computer Systems, Elsevier Science Publishers, Amsterdam, 12, (1), (May 1996), pp. 101-115.

Foster, I. et al., "Globus: A Metacomputing Infrastructure Toolkit", The International Journal of Supercomputer Application and High performance Computing, MIT Press, US, 11 (2), (Jun. 21, 1997), pp. 115-128.

Ferreira, L. et al., "Introduction to Grid Computing with globus", IBM International Technical Support Organization, 2nd edition (Sep. 2003), pp. 1-58.

Graupner, S. et al., "A framework for analyzing and organizing complex systems", Proceedings of Seventh IEEE International Conference on Engineering of Complex Computer Systems, Jun. 11-13, 2001, Piscataway, NJ, USA, (Jun. 11, 2001), pp. 155-165.

Bornhoevd, C. et al., "Integrating Smart Items with Business Processes An Experience Report", IEEE Proceedings of the 38th Hawaii International Conference on System Sciences (Jan. 3, 2005), pp. 1-8.

Bornhoevd, Christof et al., "Integrating Automatic Data Acquisition with Business Processes Experiences with SAPs Auto-ID Infrastructure", Very Large Data Conference (Sep. 3, 2004), pp. 1-8.

Boudec, Jean-Yves L., et al., "A Theory of Deterministic Queuing Systems for the Internet", Network Calculus, Online Version of the Book Springer Verlag—LNCS 2050, (May 10, 2004), pp. 1-269.

Kotov, V. et al., "Optimization of E-Service Solutions With the Systems of Servers Library", Hewlett Packard, Modeling, Analysis and Simulation of Computer and Telecommunicatiion Systems (Aug. 29, 2000), pp. 575-582.

Perkins, C. et al., "IP Mobility Support for IPv4", IETF Standard, Internet Engineering Task Force (Aug. 2002), pp. 1-100.

Deering, S. et al., "ICMP Router Discovery Messages", IETF Standard, Internet Engineering Task Force (Sep. 1991), pp. 1-19.

Anke, J. et al., "Early Data Processing in Smart Item Environments Using Mobile Services", Proceedings of the 12th IFAC Symposium on Information Control Problems in Manufacturing—INCOM, (May 19, 2006), pp. 823-828.

Golatowski, F et al., "Service-Oriented Software Architecture for Sensor Networks", International Workshop on Mobile Computing (Jun. 17-18, 2003), pp. 1-8.

Tong, G et al., "Toward QoS Analysis of Adaptive Service-Oriented Architecture", Service-Oriented System Engineering, IEEE International Workshop (Oct. 20, 2005), pp. 1-8.

Wonohoesodo, R et al., "A Role Based Access Control for Web Services", Proceedings of the 2004 IEEE International Conference on Services Computing (2004), pp. 49-56.

Prabhu, B S., et al., "WinRFID—A Middleware for the Enablement of Radio Frequency Identification (RFID) Based Applications", Mobile, Wireless and Sensor Networks (Mar. 28, 2006), pp. 1-23.

Information Society Technologies, "State of the Art in Resource Management on Wired and Wireless Access Networks with Resilience", Jul. 23, 2004, pp. 1-198.

"Collaborative Business Items", CoBIs Deliverable D104 Final Project Report, IST-004270, Version 2.0 (Mar. 2007), pp. 1-42.

Schmid, T. et al., "SensorScope: Experiences with a wireless building monitoring", REALWSN (Jun. 2005), 5 pages.

Restriction Requirement for U.S. Appl. No. 11/444,279 mailed on May 5, 2009, 5 pgs.

Werner-Allen, Geoffrey et al., "Deploying a Wireless Sensor Network on an Active Volcano", IEEE Internet Computing (Mar.-Apr. 2006), 12 pgs.

Benini, L., "A Discrete-Time Battery Model for High-Level Power Estimation", In Proceeding of the Design, Automation and Test in Europe Conference and Exhibition 2000, pp. 35-39.

Birolini, A., "Quality and Reliability of Technical Systems", IEEE Transactions on Reliability, 2nd edition, vol. 48, Issue 2 (Jun. 1999), pp. 205-206.

Bitkom, "RFID White Paper Technology, Systems and Applications", An Overview for companies seeking to use RFID technology to connect their IT systems directly to the "real" world, Dec. 2005, 50 pgs.

Bredin, Jonathan L., "Deploying Sensor Networks with Guaranteed Capacity and Fault Tolerance", In Proceedings of the 6th ACM international symposium on Mobile ad hoc networking and computing, May 27, 2005, 11 pgs.

Desovski, D., "Linear Randomized Voting Algorithm for Fault Tolerant Sensor Fusion and the Corresponding Reliability Model", IEEE International Symposium on Systems Engineering, Oct. 2005, pp. 153-162.

Ding, M et al., Localized Fault-Tolerant Event Boundary Detection in Sensor Networks, Aug. 22, 2005, 12 pgs.

Estrin, D. et al., "Next Century Challenges: Scalable Coordination in Sensor Networks", MobiCom '99, 1999, pp. 263-270.

European Search Report for EP Application No. 07010652.1 mailed on Oct. 26, 2007, 3 pgs.

European Search Report for EP Application No. 07010654.7 mailed on Oct. 5, 2007, 4 pgs.

European Search Report for Application No. 07010671.1 mailed on Nov. 16, 2007, 4 pgs.

Fok, C.L. et al., "Mobile Agent Middleware for Sensor Networks: An Application Case Study", Proceedings of the 4th International Symposium on Information Processing in Sensor Networks (Apr. 27, 2005), 6 pgs.

Frank, Christian et al., "Algorithms for Generic Role Assignment in Wireless Sensor Networks", Proceedings of the 3rd international conference on bedded networked sensor systems, Nov. 2005, 13 pgs.

Guerraoui, R. et al., "Fault-Tolerance by Replication in Distributed Systems", Proceedings of the 1996 Ada-Europe International Conference on Reliable Software Technologies, 1996, pp. 38-57.

Gupta, G. et al., "Fault-Tolerant Clustering of Wireless Sensor Networks", Wireless Communications and Networking, IEEE, vol. 3, Mar. 20, 2003, pp. 1579-1584.

Gupta, I. et al., "Cluster-Head Election Using Fuzzy Logic for Wireless Sensor Networks.", Proceedings of the 3rd Annual Communication Networks and Services Research Conference (May 31, 2005), pp. 1-71.

Harte, S. et al., "Fault Tolerance in Sensor Networks Using Self-Diagnosing Sensor Nodes.", IEEE International Workshop on Intelligent Environment, Jun. 2005, pp. 7-12.

Heinzelman, W. R., et al., "Energy-Efficient Communication Protocol for Wireless Microsensor", Proceedings of the 33rd Hawaii International Conference on System Sciences, vol. 8, 2000, pp. 1-10.

Karlof, C. et al., "Secure Routing in Wireless Sensor Networks: Attacks and Coutermeasures", Proceedings of the First IEEE Sensor Network Protocols and Applications, May 2003, pp. 113-127.

Koo, C. Y., "Broadcast in Radio Networks Tolerating Byzantine Adversarial Behavior", Proceedings of the twenty-third annual ACM symposium on Principles of distributed computing, 2004, pp. 275-282.

Koushanfar, F. et al., "Fault Tolerance Techniques for Wireless Ad hoc Sensor Networks", Proceedings of IEEE Sensors, vol. 2, 2002, pp. 1491-1496.

Krishnamachari, B. et al., "Distributed Bayesian Algorithms for Fault-Tolerant Event Region Detection in Wireless Sensor Networks", IEEE Transactions on Computers, vol. 53, No. 3, Mar. 2004, pp. 241-250.

Lamport, L. et al., "The Byzantine Generals Problem", ACM Transactions on Programming Languages and Systems, vol. 4, No. 3, Jul. 1982, pp. 382-401.

Levis, P. et al., "A Tiny Virtual Machine for Sensor Networks", in ASPLOS-X: Proceedings of the 10th international conference on Architectural support for programming languages and operating systems, ACM Press, 2002, pp. 85-95.

Li, N. et al., "A Fault-Tolerant Topology Control Algorithm for Wireless Networks.", Proceedings of the 10th Annual International Conference on Mobile Computing and Networking, 2004, pp. 275-286.

Liang, Q. "Clusterhead Election for Mobile Ad hoc Wireless Network", Proceedings on Personal, Indoor and Mobile Radio Communications, vol. 2, 2003, pp. 1623-1628.

Liu, T. et al., "Impala: A Middleware System for Managing Autonomic, Parallel Sensor Systems.", Proceedings of the ninth ACM SIGPLAN symposium on Principles and practice of parallel programming, ACM Press, Jun. 11-13, 2003, pp. 107-118.

Ma, C. et al., "A Prioritized Battery-aware Routing Protocol for Wireless Ad hoc Networks.", Proceedings of the 8th ACM international symposium on Modeling, analysis and simulation of wireless and mobile systems, 2005, pp. 45-52.

Marculescu, D. et al., "Fault-Tolerant Techniques for Ambient Intelligent Distributed Systems", Proceedings of the 2003 IEEE/ACM international conference on Computer-aided design, 2003, 8 pages.

Marti, S. et al., "Mitigating Routing Misbehavior in Mobile Ad hoc Networks", Proceedings of the 6th annual international conference on Mobile computing and networking, 2000, pp. 255-265.

Marzullo, K. "Tolerating failures of continuous-valued sensors", ACM Transactions on Computer Systems, vol. 8, No. 4, 1990, pp. 1-28.

Rakhmatov, D. et al., "Battery Lifetime Prediction for Energy-aware Computing", Proceedings of the 2002 international symposium on Low power electronics and design, 2002, pp. 154-159.

Rakhmatov, D. et al., "Time-to-Failure Estimation for Batteries in Portable Electronic Systems", Proceedings of the 2001 international symposium on Low power electronics and design, 2001, pp. 88-91.

Rong, P. et al., "Extending the lifetime of a network of battery-powered mobile devices by remote processing: A markovian decision-based approach.", Proceedings of the 40th conference on Design automation, New York, NY, USA, ACM Press, Jun. 2-6, 2003, pp. 906-911.

Rudenko, A. et al., "The Remote Processing Framework for Portable Computer Power Saving", In SAC'99: Proceedings of the 1999 ACM symposium on Applied computing, New York, NY, USA, ACM Press, 1999, pp. 365-372.

Ruiz, L. B., et al., "Fault Management in Event-driven Wireless Sensor Networks.", Proceedings of the 7th ACM international symposium on Modeling, analysis and simulation of wireless and mobile systems, Oct. 4-6, 2004, pp. 149-156.

Staddon, J. et al., "Efficient Tracing of Failed nodes in Sensor Networks", Proceedings of the 1st ACM international workshop on Wireless sensor networks and applications, Sep. 28, 2002, pp. 122-130.

Tanenbaum, A. S., et al., "Introduction to Distributed Systems", Distributed Systems: Principles and Paradigms, Prentice Hall (Jan. 15, 2002), pp. 1-33.

Woo, A. et al., "Taming the Underlying Challenges of Reliable Multihop Routing in Sensor Networks", SenSys., ACM (Nov. 5-7, 2003), 14 pages.

Wood, A. D., et al., "Denial of Service in Sensor Networks", Cover Feature, IEEE Computer, vol. 35, Oct. 2002, pp. 48-56.

Ganesan, D., et al., "Highly-Resilient, Energy-Efficient Multipath Routing in Wireless Sensor Networks.", Mobile Computing and Communications Review, vol. 1, No. 2, 1997, 13 pages.

Langendoen, K., et al., "Murphy loves potatoes: experiences from a pilot sensor network deployment in precision agriculture", IPDPS 20th International Parallel and Distributed Processing Symposium (Jun. 26, 2006), 8 pages.

Mainwaring, A., et al., "Wireless sensor networks for habitat monitoring.", In WSNA'02: Proceedings of the 1st ACM international workshop on Wireless sensor networks and applications, New York, NY, USA, ACM Press, Sep. 28, 2002, pp. 88-97.

Martinez, K., et al., "Glacial environment monitoring using sensor networks.", REALWSN (Jun. 21, 2005), 5 pages.

Rost, S., et al., "Memento: A health monitoring system for wireless sensor networks", SECON, vol. 2 (Sep. 28, 2006), pp. 1-10.

"Service-Oriented Cross-layer infrastructure for Distributed smart Embedded devices", SOCRADES (Sep. 1, 2006), pp. 1-7.

Szewczyk, R., et al., "Lessons from a sensor network expedition", In EWSN, 2004, pp. 307-322.

Tateson, J., et al., "Real world issues in deploying a wireless sensor network for oceanography", In RealWSN' 05, 2004, 6 pages.

Tolle, G., et al., "A Macroscope in the redwoods", In SenSys'05: Proceedings of the 3rd international conference on Embedded networked sensor systems, Nov. 2-4, 2005, pp. 51-63.

Szewczyk, R., et al., "An analysis of a large scale habitat monitoring application", In SenSys'04: Proceedings of the 2nd international conference on Embedded networked sensor systems (Nov. 3-5, 2004), pp. 214-226.

Graham, Steve, et al, "Web Services Base Notification 1.3", OASIS Standard (Oct. 1, 2006), pp. 1-68.

Ramanathan, N., et al., "Sympathy: a debugging system for sensor networks", In IEEE International Conference on Local Computer Networks, 2004, 2 pages.

Kotov, V., et al., "Optimization of E-Service Solutions with the Systems of Servers Library", Proceedings of the 8th International Symposium on Modeling, Analysis and Simulation of Computer and Telecommunication Systems, Apr. 2000, pp. 1-19.

Gao, Tong, et al., "Toward QoS Analysis of Adaptive Service-Oriented Architecture", Service-Oriented System Engineering, IEEE International Workshop Beijing, China, Oct. 20-21, 2005, pp. 1-8.

Vigna, G., "Mobile Code Technologies, Paradigms, and Applications", PhD Thesis, Politecnico di Milano (1998), 89 pages.

European Search Report for EP Application No. 08009613.4 mailed on May 8, 2009, 10 pages.

Benatallah, Boualem, "Facilitating the Rapid Development and Scalable Orchestration of Composite Web Services", 2005 Springer Science+Business Media, Inc., pp. 1-33.

Casati, Fabio, et al, "Specification and Implementation of Exceptions in Workflow Management Systems", ACM Transactions on Database Systems, vol. 24, No. 3, Sep. 1993, pp. 405-451.

Hwang, San-Yih, et al, "Personal Workflows: Modeling and Management", MDM 2003, LNCS 2574, pp. 141-152.

Sheng, Quan Z.., et al, "Enabling Personalized Composition and Adaptive Provisioning of Web Services", CAiSE 2004, LNCS 2084, pp. 322-337.

Tolksdorf, Robert, "Coordination Technology for Workflows on the Web: Workspace", COORDINATION 2000, LNCS 1906, Springer-Verlag Berlin Heidelberg 2000, pp. 36-50.

Anke, Jurgen, et al, "Deployment Planning for Components in Smart Item Environments based on Evaluation of Cost and Availability", pp. 1-16.

Office Action for U.S. Appl. No. 11/396,299, mailed on Jul. 9, 2009, 15 pages.

Office Action for U.S. Appl. No. 11/443,549, mailed on Aug. 13, 2009, 18 pages.

US 7,752,304, 7/2010, Bornhoevd et al. (withdrawn).

Decker, C., et al, "Coupling Enterprise Systems with Wireless Sensor Nodes: Analysis, Implementation, Experiences and Guidelines", Feb. 26, 2010, 8 pages.

Office Action for Japanese Application No. 2006-314565 (with English Translation), mailed Feb. 12, 2010, 9 pages.

Office Action for European Application No. 08017795.9, mailed Feb. 26, 2010, 7 pages.

Krause, A., et al, "Near-Optimal Sensor Placements: Maximizing Information While Minimizing Communication Cost", Proceedings of the 5th International Conference on Information Processing in Sensor Networks, Apr. 19-21, 2006, 9 pages.

Non-Final Office Action for U.S. Appl. No. 11/283,618, mailed on May 24, 2010, 42 pages.

Non-Final Office Action for U.S. Appl. No. 11/871,616, mailed Mar. 9, 2010, 46 pages.

Non-Final Office Action for U.S. Appl. No. 11/810,357, mailed Apr. 26, 2010, 44 pages.

Non-Final Office Action for U.S. Appl. No. 11/479,284, mailed May 13, 2008, 16 pages.

Non-Final Office Action for U.S. Appl. No. 11/396,299, mailed Jan. 28, 2010, 54 pages.

Non-Final Office Action for U.S. Appl. No. 11/413,230, mailed Apr. 27, 2010, 24 pages.

Final Office Action for U.S. Appl. No. 11/583,274, mailed Apr. 7, 2010, 45 pages.

US 7,801,963, 9/2010, Bornhoevd et al. (withdrawn).

Ardaiz, et al, "On Service Deployment in Ubiquitous Computing", Proceedings of the 2nd International Workshop on Ubiquitous Computing and Communications, Sep. 2001, 7 pages.

Arkin, et al, "Web Services Business Process Execution Language Version 2.0", Committee Draft, Sep. 2005, 81 pages.

Arkin, et al, "Web Service Choreography Interface (WSCI) Version 1.0", W3C Note, Aug. 2002, 84 pages.

Bohn, et al, "SIRENA—Service Infrastructure for Real-time Embedded Networked Devices: A service oriented framework for different domains", International Conference on Networking, International Conference on Systems and International Conference on Mobile Communications and Learning Technologies, 2006, 6 pages.

Box, et al, "Web Services Eventing (WS-Eventing)", Aug. 2004, 16 pages.

Crossbow, "Wireless Sensor Networks: Sensor and Data-Acquisition Boards", retrieved on Apr. 24, 2005 from http://www.xbow.com/Products/productsdetails.aspx?sid=63, 1 page.

Crossbow, "Stargate: X-Scale Processor Platform SPB 400", retrieved on Dec. 20, 2005 from http://www.xbow.com/Products/productsdetails.aspx?sid=63, 2 pages.

Clement, et al, "UDDI version 3.2, UDDI Spec Technical Committee Draft, OASIS, UDDI Spec TC", Oct. 2004, 420 pages.

Christensen, et al, "Web Services Description Language (WSDL) 1.1", W3C Note, Mar. 2001, 27 pages.

Chackrabarti, et al, "Securing the Pharmaceutical Supply Chain", Technical Report, Auto-ID Centre Institute for Manufacturing, University of Cambridge, Jun. 1, 2003, 19 pages.

California Software Laboratories, "White Paper: The JetSend Appliance Architecture", retrieved from http://www.calsoftlabs.com/whitepapers/jetsend-architecture.html, 2002, 28 pages.

Davenport, "Process Innovation: Reengineering work through information technology", Harvard Business School Press, 1993, 6 pages.

de Sales, et al, "Towards the UPnP-UP: Enabling User Profile to Support Customized Services in UPnP Networks", Proceedings of the 2008 The Second International Conference on Mobile Ubiquitous Computing, Systems, Services and Technologies, 2008, pp. 206-211.

Decker, et al, "CoBIs Platform Survey and State-of-the-Art Sensor Platforms", CoBIs Deliverable Report, Aug. 2005, 51 pages.

Deering, et al, "Internet Protocol, Version 6 (Ipv6) Specification", Network Working Group, Dec. 1998, 39 pages.

Gauger, "FlexCup—Flexible and Efficient Code Updates for Sensor Networks", Summer School on Wireless Sensor Networks and Smart Objects; Universitat Stuttgart, Aug. 29-Sep. 3, 2005, 8 pages.

Geller, et al, "Web Services Eventing (WS-Eventing)", Aug. 2004, 38 pages.

Gudgin, et al, "SOAP Message Transmission Optimization Mechanism", Jan. 25, 2005, 15 pages.

Guttman, "Service Location Protocol", Version 2, Jun. 1999, 55 pages.

Haas, "Service Deployment in Programmable Networks", PhD Thesis, ETH Zurich, Switzerland, 2003, 253 pages.

Hammer, et al, "Reengineering the Corporation—A Manifesto for Business Revolution", Nicholas Brealey Publishing, May 1994, 14 pages.

Han, et al, "Sensor Network Software Update Management: A Survey", Journal of Network Management, 2005, 26 pages.

Intel Research, "An Introduction to Wireless Sensor Networks", Technical Report, 2004, 6 pages.

Karuppiah, et al, "Design and Implementation of Multihomed IPv6 Testbed Network for Research Community: The Malaysian IPv6 Network Operation Centre Experience", IWS2000, APAN Conference, Tsukuba, 2000, 6 pages.

Kim, et al, "A leader election algorithm in a distributed computing system", 5th IEEE Workshop on Future Trends of Distributed Computing Systems, 1995, 5 pages.

Kiselyov, "Functional XML parsing framework: SAX/DOM and SXML parsers with support for XML Namespaces and validation", 2001, 42 pages.

Lampe, et al, "A ubiquitous computing environment for aircraft maintenance", SAC '04: Proceedings of the 2004 ACM Symposium on Applied Computing, 2004, pp. 1586-1592.

Law, et al, "Assessing Security-Critical Energy-Efficient Sensor Networks", 2002, 10 pages.

Malpani, et al, "Leader election algorithms For mobile ad hoc networks", Proceedings of the 4th international Workshop on Discrete Algorithms and Methods for Mobile Computing and Communications, Aug. 11, 2000, pp. 96-103.

Nochta, et al, "Relocatable services and service classification scheme", Authorization Level: Public (PU) Version 1.0, Feb. 2005, 59 pages.

Nokia, "Nokia Intellisync Device Management", Overview for IT Managers, May 2007, 19 pages.

"OSGI Service Platform", Release 3, IOS Press, Mar. 2003, 602 pages.

Parikh, et al, "Security in Sensor Networks", CS 588: Cryptography, 2001, 28 pages.

Park, "Specification of the Bluetooth System: Wireless connections made easy", Covered Core Package version: 1.2, Nov. 2003, 1200 pages.

Passing, "Profiling, Monitoring and Tracing in SAP WebAS", SAP Library, Jun. 22, 2005, 9 pages.

Phillips, "Aqueduct: Robust and Efficient Code Propagation in Heterogeneous Wireless Sensor Networks", Master's Thesis submitted to the Graduate School of the University of Colorado, 2005, 61 pages.

Postel, "Internet Control Message Protocol", Protocol Specification. Request for Comments RFC 792, 1981, 21 pages.

Postel, "Internet Protocol", Protocol Specification, Request for Comments RFC 791, 1983, 51 pages.
Postel, "Transmission Control Protocol", Protocol Specification, Request for Comments RFC 793, 1981, 91 pages.
Postel, "User Datagram Protocol", Protocol Specification, Request for Comment, RFC 768, Information Sciences Institute, 1981, 3 pages.
Rebahi, et al, "Service Management Module (SMM)", 2004, 61 pages.
Rostad, et al, "Closing the Product Lifecycle Information Loops", 18th International Conference on Production Research, 2005, 5 pages.
SAP, "SAP NetWeaver: Providing the foundation to enable and manage change", retrieved on Nov. 10, 2005 from http://www.sap.com/solutions/netweaver/index.epx, 1 page.
SAP, "Security Guide for Mobile Engine 2.1 SP02", SAP Library—SAP Mobile Engine, Dec. 1, 2004, 13 pages.
SAX, "About SAX", retrieved on Jan. 6, 2006 from http://www.saxproject.org/, 1 page.
Scheer, "Aris-Business Process Modeling", Springer 3rd edition, 2000, 10 pages.
Schlimmer, et al, "Devices Profile for Web Services", May 2005, 39 pages.
Schlimmer, et al, "Web Services Dynamic Discovery (WS-Discovery)", Apr. 2005, 42 pages.
Schneider, et al, "Application and Scenarios of RFID technology", Seminar Datenschutzaspekte im Umfeld des Pervasive Computing, 2004, 29 pages.
Schneier, "Applied Cryptography", 2nd edition, John Wiley & Sons, Inc., 1996, 18 pages.
Speiss, et al, "Collaborative Business Items", Sixth Framework Programme, Information Society Technology Technical Report, CoBIsDeliverable D101, 2005, 59 pages.
Speiss, "Collaborative Business Items: Decomposing Business Process Services for Execution of Business Logic on the Item", European Workshop on Wireless Sensor Networks, Istanbul, 2005, 3 pages.
Speiss, et al, "going beyond auto-id—a service-oriented smart items infrastructure", JEIM, Mar. 2007, 9 pages.
Strohbach, et al, "Cooperative Artefacts:Assessing Real World Situations with Embedded Technology", In Proceedings of the 6th International Conference on Ubiquitous Computing, Nottingham, UK, 2004, pp. 250-267.
Sun Microsystems, "Connected Limited Device Configuration", Java™ 2 Platform, Micro Edition (J2ME™) Specification Version 1.1, Mar. 2003, 60 pages.
Sun Microsystems, "Jini Architecture Specification", Version 1.2, Dec. 2001, 26 pages.
Sun Microsystems, "Sun SPOT System: Turning Vision into Reality", Sun SPOT System Project description, 2005, 4 pages.
Talwar, et al, "Approaches for Service Deployment", IEEE Internet Computing, vol. 9(2), Mar.-Apr. 2005, pp. 70-80.
"Universal Plug and Play (UPnP)", Wikepedia, the free encyclopedia, Retrieved on Dec. 20, 2005, from http://en.wikipedia.org/wiki/Universal_Plug_and_Play, 6 pages.
"UPnP Device Architecture 1.0", UPnP Forum, 1999, 80 pages.
van de Loo, et al, "Enterprise Services Design Guide", Version 1.0, SAP, 2005, pp. 1-40.
van der Aalst, "Modelling and analysing workflow using a Petri-net based approach", Proceedings of the 2nd Workshop on Computer-Supported Cooperative Work, Petri nets and related formalisms, 1994, pp. 31-50.
Veizades, et al, "Service Location Protocol. Request for Comments RFC 2165", Network Working Group, Jun. 1997, 72 pages.
VeriSign, "The EPCglobal Network: Enhancing the Supply Chain", VeriSign Technical Report, 2004, 8 pages.
Villanueva, et al, "Context-Aware QoS Provision for Mobile Ad-hoc Network-based Ambient Intelligent Environments", Header Background Image, 12(3), 2006, 13 pages.
Waldo, "The Jini architecture for network-centric computing", Communications of the ACM archive, vol. 42 , Issue 7, Jul. 1999, pp. 76-82.
Wander, et al, "Energy Analysis of Public-Key Cryptography for Wireless Sensor Networks", UC Santa Cruz, Sun Microsystems Laboratories, 2005, 5 pages.
Wang, et al, "Timing Analysis of Real-Time Networked RFID Systems", Cambridge Auto-ID Lab, Cambridge UK, 2004, 4 pages.
Warneke, et al, "Smart dust: Communicating with a cubic-millimeter computer", Computer, 34(1), 2001, pp. 44-51.
Weiser, "The computer for the 21st century", ACM SIGMOBILE Mobile Computing and Communications Review archive, vol. 3 , Issue 3, Jul. 1999, 6 pages.
"Java Native Interface (JNI)", Wikepedia, the free encyclopedia, Retrieved on Dec. 20, 2005, from http://en.wikipedia.org/wiki/Jini, 6 pages.
"Service Location Protocol (SLP)", Wikepedia, the free encyclopedia, Retrieved on Dec. 20, 2005, from http://en.wikipedia.org/wiki/Service_Location_Protocol, 1 page.
Woods, "Enterprise Services Architecture", Galileo Press, 2003, 10 pages.
Non-Final Office Action for U.S. Appl. No. 11/496,641, mailed Jul. 29, 2010, 55 pages.
Non-Final Office Action for U.S. Appl. No. 11/496,641, mailed Jul. 29, 2010, 63 pages.
Final Office Action for U.S. Appl. No. 11/283,618, mailed Oct. 5, 2010, 26 pages.
Non-Final Office Action for U.S. Appl. No. 11/283,618, mailed May 24, 2010, 42 pages.
Non-Final Office Action for U.S. Appl. No. 11/479,284, mailed Aug. 11, 2010, 19 pages.
Non-Final Office Action for U.S. Appl. No. 11/479,284, mailed Oct. 30, 2009, 19 pages.
Final Office Action for U.S. Appl. No. 11/479,284, mailed Jun. 11, 2009, 4 pages.
Notice of Allowance for U.S. Appl. No. 11/479,284, mailed on Oct. 13, 2010, 19 pages.
Non-Final Office Action for U.S. Appl. No. 11/583,274, mailed Oct. 7, 2009, 22 pages.
Non-Final Office Action for U.S. Appl. No. 11/583,274, mailed Aug. 5, 2010, 21 pages.
Notice of Allowance for U.S. Appl. No. 11/413,230, mailed Oct. 13, 2010, 14 pages.
Non-Final Office Action for U.S. Appl. No. 11/413,230, mailed Oct. 16, 2009, 11 pages.
Non-Final Office Action for U.S. Appl. No. 11/871,616, mailed Sep. 16, 2010, 29 pages.
Final Office Action for U.S. Appl. No. 11/433,621, mailed Dec. 23, 2010, 40 pages.
Non-Final Office Action for U.S. Appl. No. 11/433,621, mailed Aug. 17, 2010, 43 pages.
Final Office Action for U.S. Appl. No. 11/443,549, mailed Mar. 17, 2010, 42 pages.
Final Office Action for U.S. Appl. No. 11/444,279, mailed Sep. 10, 2010, 26 pages.
Non-Final Office Action for U.S. Appl. No. 11/444,279, mailed Sep. 28, 2009, 17 pages.
Non-Final Office Action for U.S. Appl. No. 11/444,279, mailed Mar. 22, 2010, 46 pages.
Notice of Allowance for U.S. Appl. No. 11/284,195, mailed Mar. 4, 2011, 46 pages.
Non-Final Office Action for U.S. Appl. No. 11/443,549, mailed Jan. 6, 2011, 33 pages.
Final Office Action for U.S. Appl. No. 11/810,357, mailed Feb. 17, 2011, 38 pages.
Non-Final Office Action for U.S. Appl. No. 11/496,641, mailed on Jun. 7, 2011, 37 pages.
Non-Final Office Action for U.S. Appl. No. 11/283,618, mailed Mar. 31, 2011, 33 pages.
Advisory Action for U.S. Appl. No. 11/433,621, mailed Apr. 7, 2011, 4 pages.
Final Office Action Response for U.S. Appl. No. 11/433,621, filed Mar. 23, 2011, 14 pages.

Non-Final Office Action for U.S. Appl. No. 11/444,279, mailed Apr. 28, 2011, 36 pages.

Notice of Allowance for U.S. Appl. No. 11/583,274, mailed Apr. 4, 2011, 28 pages.

Advisory Action for U.S. Appl. No. 11/810,357, mailed Apr. 28, 2011, 7 pages.

Final Office Action Response for U.S. Appl. No. 11/810,357, filed Apr. 14, 2011, 18 pages.

Non-Final Office Action for U.S. Appl. No. 11/871,616, mailed Mar. 21, 2011, 18 pages.

* cited by examiner

SYSTEM MONITOR FOR NETWORKS OF NODES

TECHNICAL FIELD

This description relates to smart item technologies.

BACKGROUND

Software systems exist that provide various services for enterprises or other organizations. Such software systems may rely on decentralized, manual, and potentially error-prone data collection, while storing collected data in a centralized back-end system where business logic execution also occurs. These and other software systems may be extended through the use of smart item (also referred to as smart device), technologies, in which physical items (e.g., goods, tools, rooms, vehicles, persons, or shelves) are augmented or enhanced by the addition or inclusion of locally-provided or embedded technology.

For example, radio-frequency identification (RFID) systems, embedded systems, sensor motes, and/or sensor networks may be used in the above-described manner to provide business software applications with fast access to real-world data. For example, smart item technologies may be used support the detection, reading, or writing of RFID tags, as well as to support communication with, and control of, wireless sensor networks and embedded systems. In many instances, smart items may include, or may be associated with, devices having local processing power, memory, and/or communication capabilities, and that are capable of providing data about the device and its properties, or information about a current state or environment of the smart item devices. Accordingly, some such devices may be used in the execution of service components of back-end or underlying business applications, and, in particular, may do so in a collaborative way, e.g., by forming mobile ad-hoc networks to collect, process, or transmit business data.

Examples of smart items may include an RFID tag, which may be passive or active, and which may be attached to a physical object, as referenced above, and used to provide product or handling information related to the object. Other examples of smart items may include various sensors, such as, for example, environmental sensors (e.g., a temperature, humidity, or vibration sensor), which, as just referenced, may be capable of communicating to form one or more sensor networks. These and other types of smart items also may include embedded systems, which may refer generally to any system in which a special-purpose processor and/or program is included, and/or in which the system is encapsulated in the device being controlled.

Through automatic real-time object tracking and local, on-site execution of business logic, smart item technology may provide businesses with accurate and timely data about business operations, and also may help streamline and automate the business operations. Accordingly, cost reductions and additional business benefits (e.g., increased asset visibility, improved responsiveness, and extended business opportunities) may be obtained.

Using their local communication capabilities, smart items may communicate with one another to form local networks, e.g., sensor networks. In a given sensor network, such communication may occur using a proprietary communications protocol that is understood by each of the smart items in the network, but that may not be understood by other smart items and/or networks. For example, the communications protocol of a sensor network may be unique to a particular hardware and/or software platform used in the sensor network, or may be unique to a manufacturer of the smart items. Accordingly, it may be difficult to collect data regarding such sensor networks in a timely fashion, in a format that is applicable to multiple ones of the sensor networks, and without overwhelming or depleting communications resources of the devices and/or sensor networks. As a result, for example, back-end applications depending on data from the sensor network(s) may not have access to the data in a sufficiently timely or useful fashion.

SUMMARY

According to one general aspect, a system includes a first message handler configured to receive first monitor data associated with a first network, the first network using a first communications protocol, a second message handler configured to receive second monitor data associated with a second network, the second sensor network using a second communications protocol, a message transport system configured to receive the first monitor data and the second monitor data and further configured to route the first monitor data and the second monitor data in a common protocol, based on content thereof, and a system monitor configured to receive the first monitor data and the second monitor data from the message transport system, in the common protocol and based on the routing, and further configured to generate a system model describing the first network and the second network, based on the first monitor data and the second monitor data.

According to another general aspect, a method includes receiving first monitor data at a first message handler associated with a first sensor network, in an encapsulated data packet including the first monitor data therein, using a first communications protocol that is used by the first sensor network, and translating the first monitor data from the first communications protocol to a common communications protocol. The method further includes receiving the first monitor data at a message transport system that is configured to forward the first monitor data to a system monitor in the common communications protocol, receiving second monitor data at the message transport system from a second message handler associated with a second sensor network, in the common communications protocol, routing the first monitor data and the second monitor data to a system monitor configured to monitor a state of the first sensor network and/or the second sensor network, and updating a system model providing the state of the first sensor network and/or the second sensor network, based on the first monitor data and the second monitor data.

According to another general aspect, a system includes a plurality of message handlers, each message handler associated with at least one sensor network in which a plurality of devices are configured to communicate wirelessly with one another using a platform-dependent communications protocol, a plurality of system monitors configured to collect monitor data related to the at least one sensor network from the plurality of message handlers, each system monitor configured to provide a system model representing state information about the at least one sensor network, and a message transport system configured to route messages related to the monitor data between the plurality of system monitors and the plurality of message handlers, based on content of the messages.

The details of one or more implementations are set forth in the accompanying drawings and the description below. Other features will be apparent from the description and drawings, and from the claims.

DETAILED DESCRIPTION

Figure 1:
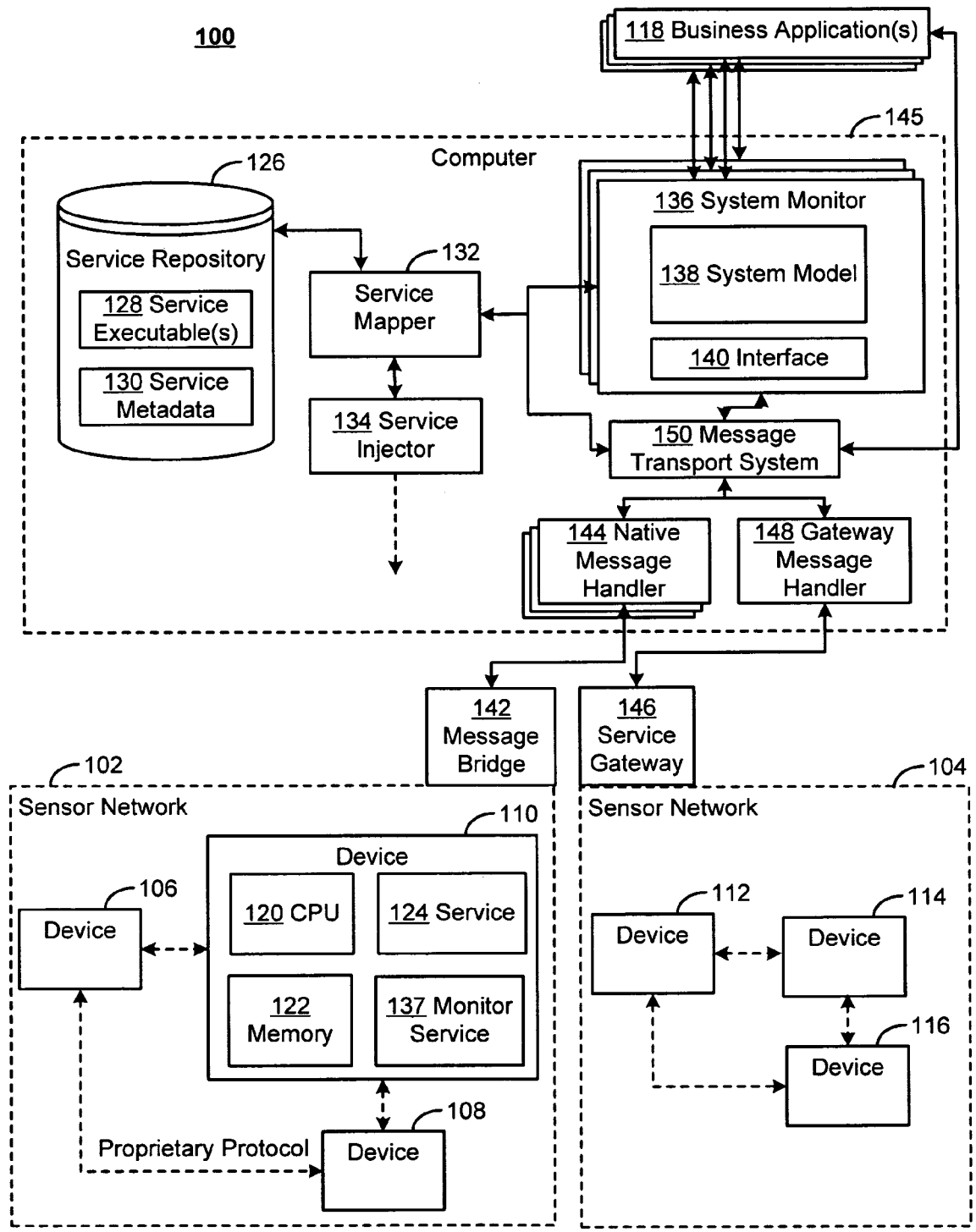
FIG. 1 is a block diagram of a system for monitoring networks of nodes.

FIG. 1 is a block diagram of a system 100 for monitoring networks of nodes. In some example implementations, the monitoring of the system 100 may be used in conjunction with a mapping function of the system 100, by which services (e.g., executable code) are mapped onto best-suited nodes selected from a plurality of networks and/or nodes. In other example implementations, operators and users of the system 100 may access desired monitor data regarding the networks and/or nodes, and so may be more capable of understanding a current state of the networks and nodes, and may thus be better able to use the system 100 in a desired fashion. In additional or alternative implementations, the system 100 may provide the monitor data to applications, e.g., business applications, for use by the business applications or operators thereof.

As described below, the system 100 may be used to monitor different, distinct instances of a network platform, as well as instances of otherwise incompatible network platforms. That is, for example, the system 100 may be configured to monitor a plurality of different networks, even when the nodes of the networks use separate, different, and/or proprietary communications protocols to communicate with one another within their respective networks.

In the example of FIG. 1, a network may include or refer to sensor networks 102 and/or 104, where the sensor networks 102 and 104 may implement different communications protocols. In the example of FIG. 1, the sensor network 102 includes various smart items or smart devices 106, 108, and 110, while the sensor network 104 includes smart item devices 112, 114, and 116. In this context, it should be understood that the terms "smart items," "smart devices," "smart item devices," and similar terms, may be used similarly or interchangeably in various contexts. For example, the term "smart item" or "smart device" may refer to a device having local processing, storage, and communications capability, as referenced herein, or may refer to a combination of such a device and an object to which the device is affixed (e.g., a pallet containing merchandise for sale).

As part of the sensor networks 102 and 104, such devices and/or device/object combinations also may be referred to as "nodes," or "network nodes" in some contexts. In the present description, the term "device" is used for brevity and consistency to refer to the described devices having the described features within the sensor networks 102 and 104. However, it should be understood that the concepts described herein related to monitoring of networks of nodes may relate to virtually any such setting. The concepts and techniques may be particularly useful, for example, in contexts similar to those described herein, in which the networks may include wireless networks in which the nodes are constrained with regard to available energy, memory, computational power, and bandwidth.

Thus, the devices 106-116, and potentially other devices within the sensor networks 102 and 104 (and other sensor networks) may provide real-world data to one or more business data processing systems, applications, or processes, in a timely and accurate manner. For example, as shown near the top of FIG. 1, the system 100 includes, or communicates with, a business application(s) 118. Examples of the business application(s) 118 are described in more detail below, e.g., with respect to FIG. 7, but may include, for example, inventory management systems, supply chain management systems, retail store management systems, warehouse management systems, product life cycle management systems, and any other system(s) that may be used to execute business processes with respect to real-world objects, where such real-world objects may include, for example, products for sale, pallets or other shipment elements, patients, or manufacturing materials/equipment. Thus, the business processes, including those portions of the business processes deployed and executed at the local level of the real-world objects, may be used, for example, to determine inventory levels, set pricing levels, evaluate marketing strategies, evaluate manufacturing or production technologies, reduce theft, or maintain safety.

In FIG. 1, the device 110 is illustrated as including a central processing unit (CPU) 120, as well as a memory 122. Thus, the device 104 should be understood to be capable of various levels of computing capabilities, including, for example, processing or transmitting sensed data (in the case where the device 110 includes, or is associated with, a sensor). Although not specifically illustrated in FIG. 1 for the sake of clarity and brevity, it should be understood that all of the devices 106-116 also may include the same, additional, or alternative computing capabilities, including, for example, the communication capability to form and participate in the sensor networks 102 and 104, as shown, which may include, for example, a wireless network(s) and/or a peer-to-peer network(s). That is, it should be understood that the devices 106-116 may include other standard elements and features, not specifically illustrated in FIG. 1 for the sake of brevity, such as, for example, a (e.g., radio) transceiver and a local power supply/battery.

Thus, the sensor networks 102 and 104 may be used to collect, process, filter, aggregate, or transmit data that may be useful to related business processes, and, more specifically, may be used to execute portions of the business processes (e.g., business logic), that are best-suited for (or benefit most highly from) local execution. Specifically, in the example of FIG. 1, portions of a business processes/business logic deployed on the sensor networks 102 and 104 may include a service 124 that is deployed on the device 110.

In general, it should be understood that the service 124, and other services discussed herein, refer generally to software components that support a defined functionality, may provide a defined interface through which the service may be invoked, and that may be combined with one another to obtain/provide additional or more complex functionalities. For example, the service 124 may represent an enabling service that, e.g., enables collaboration between two or more of the devices 106, 108, and 110; or may represent a management service that, e.g., manages power consumption of the device 110; or may represent actual business services that, e.g., execute business-specific logic (such as determining a local temperature, and whether the local temperature exceeds a defined value, and whether any action should be taken in response to the local temperature exceeding the defined value).

More specifically, the service 124 may represent instances of services (or service templates) stored in a service repository 126. The service repository 126 may thus provide a convenient location for registering, storing, and accessing services that may be deployed for use within the sensor network 102 (and/or the sensor network 104).

The service repository 126 stores service executables 128 and service metadata 130, where the service executables 128 represent, for example, software code that may be instantiated onto the devices 106, 108, and 110 (and/or the devices 112-116) for actual execution of associated business logic, while the service metadata 130 may represent or include, for example, various service descriptions and/or requirements that relate to whether and how the service(s) may be executed on one or more devices of the sensor network 102 (and/or the sensor network 104).

For example, the service metadata 130 may include a service behavior description, or technical constraints of the service. For example, technical constraints may include a required CPU type or speed, an amount of (free) memory that is needed, a type or speed of connection that is required or preferred, an operating system version/name/description, or a type or status of a battery or other device power source(s). With respect to the service metadata 130, distinctions may be made between static and dynamic service requirements, such as hardware requirements. For example, a static value such as a total memory or maximum processing speed may be included, along with dynamic values such as available memory/processing/power, and/or a number or type of other services that may be allowed to concurrently run on a device together with the service(s) in question, at an execution time of the service(s).

The system 100 includes a service mapper 132 that is operable, for example, to select at least the device 110 as a selected device from among the plurality of devices 106, 108, and 110 of the sensor network 102, for deploying the service 124 thereon, as shown. For example, the service mapper 132 may operate in response to a request from an administrator, or may act automatically in response to a command from an associated business process (e.g., the business application 118), or in response to some determined stimulus (e.g., addition of a device to, or removal of a device from, the sensor network 102). Thereafter, the service mapper 132 may access the service repository 126, and may determine appropriate information (i.e., information appropriate to the request or command) from the service metadata 130 and the service executable(s) 128.

Services executables, such as the service executables 128, may then be deployed onto, in this case, the device 110, using a service injector 134, thereby creating services (or service instances), such as, e.g., the service 124. Once an appropriate service mapping has been performed by the service mapper 132, a service injector 134 may be used to install and start/activate the mapped service (e.g., the service 116) on the device 104. The service injector 134, more generally, also may be used to manage a life cycle of the service(s), e.g., by performing service updates or stopping the service(s) when necessary.

In determining whether and how to map services from the service repository 126 onto one or more of the devices 106-116, the service mapper 132 may be in communication with a system monitor 136. The system monitor 136 may be configured to detect or otherwise determine information related to the devices 106-116, related to the sensor networks 102 and/or 104 as a whole (e.g., to interactions between the devices 106-116), or related to an environment or use of the devices 106-116. The system monitor 136 may thus provide, for example, hardware health diagnosis, or may provide statistical data for system software (e.g., names and runtime information regarding the service 124), or may relate to or include sensor data collected by sensors associated with the sensor networks 102, 104. In some cases, described in more detail below, application or service-specific monitoring may be implemented, based on the needs of the application/service (e.g., the business application(s) 118).

The system monitor 136 may thus be implemented, for example, as a server component that is continuously running and monitoring some number of networks of nodes/devices (shown in FIG. 1 as sensor networks 102, 104, but potentially including other numbers or types of networks), where the devices may potentially communicate with one another wirelessly. In so doing, the system monitor 136 may, for example, communicate with the business application 118 in order to provide the business application 118 with a recent, complete (or partial) view of a state of one or both of the sensor networks 102, 104. Further, as already described, the system monitor 136 may provide the service mapper 132 with such a view of a state of the sensor network(s) 102, 104, e.g., for use in performing service mapping functionality. Still further, the system monitor 136 may provide such a view to virtually any service, user, or application, depending on context.

In the example of FIG. 1, the system monitor 136 receives messages from the sensor networks 102 and 104, and provides the above-described network view using a system model 138, e.g., a representation of devices and services built by the system monitor 136 by recording/querying messages/events from the networks 102, 104. The system model 138 may include, for example, a data structure using a certain ontology and/or schema. For example, the system model 138 may include a description of various technical capabilities of the devices 106-116, provided in an eXtensible Markup Language (XML)-based language, e.g., according to a defined XML schema. Of course, other formats, languages, structures, and/or protocols may be used, as well.

More generally, monitor data stored in the system model 138 may include, for example, a number and/or identifier of each device in the network(s) 102, 104, the remaining battery power of a device, the most-recently read sensor values, a current error rate over a communication channel, a list of services currently installed on each device, or data that was previously stored on a given device. As further examples, the system model 138 also may include a device description, a software description, a hardware description, or a device status. For example, the device description may include a device name, identifier, or type, or may include vendor information including a vendor name or vendor website. The software description may include an operating system description, including version and/or vendor, or may include a description of services running or allowed to run on the device platform. The hardware description may include information about attributes of the CPU 120 (e.g., name or speed), memory 122 (e.g., type and total amount of memory), or connection capabilities (e.g., connection speed or connection type) of the device(s). The device status may include more volatile information, including a device location, current CPU usage, or remaining memory. If a device fails to communicate with, or report to, the system monitor 136 after a period of time, then a device status of that device may be changed to disconnected, and the device may be removed from the system model 138. Other device or service information may be included in the system model 138, as would be apparent, and all such information may be referred to as, or may include the terms, device metadata, device characteristics and/or device capabilities.

The system model 138 also may represent or include network metadata, which may include, for example, various network parameters, particularly where such parameters are dynamic and not necessarily discernable from information about any single device. One such example of such network metadata may include available bandwidth on the sensor network 102 (or 104). Other examples may include location information, mobility characteristics of the network(s) as a whole, and reliability of network connections.

The system monitor 136, as described above, may be implemented as a server component, which may expose a standard, discoverable interface 140, e.g., to the business application 118 and/or the service mapper 132. For example, as illustrated in FIG. 1, the business application 118 actually may include a number of different business applications, such as those referenced above, or others. Meanwhile, as is also reflected in FIG. 1, there may be a plurality of system monitors 136, since, e.g., a given system monitor may be assigned responsibility for monitoring a certain number or type of network, device, or service, or some other parameter(s).

As such, for example, it may be necessary for a given business application to discover a desired system monitor, e.g., a system monitor having desired characteristics. Thus, for example, the interface 140 may be implemented as a Web service. A Web service refers generally to a software application that provides functionality and data according to a defined interface that governs and defines interactions between the Web service and the, in this case, business application 118. Such a Web service may be discovered by the business application 118 by way of a directory of services, such as, for example, the Universal Description, Discovery, and Integration (UDDI) directory, a distributed directory or registry designed to allow parties to find a given service/functionality on a network. The UDDI uses a language known as the Web Services Description Language (WSDL), which is an XML-formatted language designed to describe capabilities of the web services in a way that allows requesting business application 118 to take advantage of those capabilities. Messages to/from such a Web service may be wrapped in a Simple Object Access Protocol (SOAP) envelope, and sent using Hypertext Transfer Protocol (HTTP). Of course, other types of interfaces may be used, such as, for example, the Common Object Request Broker Architecture (CORBA), and/or other techniques for defining or implementing Application Program Interfaces (APIs) for inter-application and/or service-oriented communications.

As referenced above, in FIG. 1, the sensor networks 102 and 104 may each implement a different communications protocol that is used by the devices 106-110 and 112-116 to communicate with one another within their respective networks. For example, the sensor networks 102, 104 may use one or more communications protocols such as, for example, ConCom (AwareCon), Zigbee, Data Collection Protocol (DCP), Universal-Plug-n-Play (UPnP), and/or various other protocols. Further, for example, the sensor network 102 may implement services in the context of a specific platform, e.g., a Java platform (e.g., Java 2 Micro Edition (J2ME)), so that a communications protocol of the sensor network 102 may be platform-dependent, and may not be (fully) inter-operable with a platform of the sensor network 104, which may be, for example, a C/C++ based platform.

To maintain the system model 138 in a current, up-to-date form, the system monitor 136 uses state information originating from, e.g., the devices 106-110. For example, a monitor service component 137 may be implemented directly on one or more of the devices of the sensor networks 102, 104, e.g., on the device 110, as shown, where the monitor service 137 may be capable of providing (either autonomously or in response to a request/invocation) monitor data about the device 110, such as current processing capabilities, recently-read sensor values, or a list of services running on the device 110 (e.g., the service 124). Nonetheless, as just described, it may be the case that the system monitor 136 cannot directly communicate with any of the devices 106-110, since the system monitor 136 may not understand the communications protocol of the sensor network 102. Accordingly, protocol translation may be implemented.

For example, a message bridge 142 may be used to allow sending and receiving messages to/from the sensor network 102 in the proprietary, platform-dependent format thereof. Operation of the message bridge 142 is described in more detail below, e.g., with respect to FIG. 3, but, generally speaking, the message bridge 142 is configured to encapsulate messages in the proprietary, platform-dependent protocol of the sensor network 102, into a format compatible with a standard interface and/or connection that is shared with a native message handler 144. For example, the message bridge 142 and the native message handler 144 may share an Ethernet or serial connection.

The message bridge 142 may be implemented as a piece of hardware (e.g., a base station) within a physical vicinity (e.g., within a transmission range and/or within a defined distance of the devices 106-110) of the sensor network 102. For example, the message bridge 142 may be attached to a personal computer (PC) using a serial port, or using a standard wireless connection (e.g., Wireless Local Area Network (WLAN)), and the PC may be used to broadcast the message to the native message handler 144, e.g., over a wired LAN.

The native message handler 144 may be implemented on a personal computer (PC), such as, for example, a computer 145. In FIG. 1, the computer 145 is illustrated as running virtually an entire middleware system for facilitating communications between, monitoring of, and use of, the sensor networks 102, 104 by the business application(s) 118. Of course, it should be understood that such an example is merely a conceptualization or illustration, and that some or all of the elements of the computer 145 may be executed on different computers, including server computers, workstations, desktop computers, laptop computers, personal digital assistants (PDAs), or mobile phones. For example, as just mentioned, the message bridge 142 may forward encapsulated packets from the sensor network 102 to the native message handler 144, and the message bridge 142 may run on the computer 145 itself, or may be configured to communicate with the computer 145 to exchange messages with the native message handler 144 running thereon.

Meanwhile, the sensor network 104 may be associated with a service gateway 146. As described in more detail below, e.g., with respect to FIG. 4, the service gateway 146 may be configured to provide a proxy for each of the devices 112-116, and/or for each of the services running on each of the devices 112-116. The service gateway 146 may be configured to provide each such proxy for providing monitor data associated with the devices 112-116, so that a gateway message handler 148 may easily be configured to provide the monitor data in a standard form to the system monitor 136, by, for example, determining the monitor data from the proxies of the service gateway 146 (rather than querying the devices 112-116 and respective services themselves, as is done by the native message handler 144 and the message bridge 142).

Thus, the message handlers 144, 148 provide a layer of abstraction for the hardware of their respective sensor networks 102, 104. Accordingly, any service or component communicating with the message handlers 144, 148 may only need to be aware of a single (type of) interface, i.e., the interfaces of the message handlers 144, 148, and may use a common or standard protocol to communicate with the message handlers 144, 148. In this way, for example, the system monitor 136 may interact with a number of sensor networks, even if the sensor networks are using a number of different hardware and/or software environments, and may only need to be aware of the common or standard communications protocol(s) and related interfaces.

For example, the first sensor network 102 may be associated with a platform that allows for high-speed data transmission of monitor data collected from the sensor network 102. However, such a platform may suffer from quickly-depleting battery/power resources. Meanwhile, the sensor network 104 may be configured to operate with a minimum of power, but may not be configured for a high degree of mobility (e.g., is not able to easily allow addition or removal of the devices 112-116, or other devices). In other words, it may be the case that no network platform exists or is implemented that may provide every desired feature or capability for a desired application. Thus, it may be the case that different network platforms, particularly given a typical resource-constrained environment of the sensor networks 102, 104, may be required. In this way, for example, the message handlers 144 and 148 (and associated message bridge 142 and the service gateway 146) essentially allow the system monitor 136 to act as if only one communications protocol (and network platform) exists, e.g., with respect to generating and updating the system model 138. This is true even though, as shown, the native message handler 144 actually may represent a plurality of native message handlers, i.e., one for each different communication protocol that may be implemented by a number of sensor networks.

As just described above, the structure of the system 100 allows the system monitor 136 to communicate with, e.g., to query and to receive updates from, a number of different sensor networks (including, but not limited to, the sensor networks 102, 104), as if all of the different sensor networks were, for practical purposes of the system monitor 136, running the same communications protocol(s) on the same hardware and software platform(s). Even so, it should be understood that, as also described, there may be a number of different instances of the system monitor 136 running as part of the system 100, e.g., to perform load balancing between the different instances.

Therefore, a message transport system 150 may be configured to transport messages and/or events from each message handler 144, 148 to the appropriate system monitor(s) 136, and that is also configured to transport messages (e.g., invocations) from one or more of the system monitors 136 to a specified one (or more) of the sensor networks 102, 104. For example, the message transport system 150 may be implemented as a content-based messaging system, that is configured to analyze messages and determine a source and/or destination thereof based on a content of the messages, and may operate using the common or standard communication protocol(s) referenced above.

For example, several of the business applications 118 may be interested in temperature measurements detected by one or more of the sensor networks 102, 104. For instance, one or more of the business applications may be associated with food safety, or with hazardous materials/chemicals safety, and the service 124 may be a temperature-detection service. Then, when the native message handler 144 receives messages from the message bridge 142, the native message handler 144 may encapsulate the messages for forwarding to the message transport system 150 over an appropriate interface, as described herein. The message transport system 150 may analyze the contents of the messages, to determine, e.g., that measurements in degrees Celsius (or other temperature-related parameters) are included. Accordingly, the message transport system 150 may forward the messages to one of the system monitors 136 that is associated with temperature detection, and two (or more) of the business applications 118 may subscribe to the particular system model 136, in order to receive temperature updates.

In the other direction, one or more of the business applications 118 may wish to determine specific temperature measurements or information, and may interface with an appropriate system model 136 to send a request or query for temperature data over the message transport system 150. The message transport system 150 may again determine, e.g., from content of the messages received from the system monitor 136, that the received messages are concerned with temperature measurements. Then, the message transport system 150 may forward the message/query to the native message handler 144 from among a plurality of native message handlers (and, potentially, from among a plurality of gateway message handlers), for forwarding to the message bridge 142, and thereby to the sensor network 102 (e.g., to the device 110). In this way, one or more of the business applications 118 may interact with the sensor networks 102, 104 to determine or process business-specific information that may be available with respect to one or more of the sensor networks 102, 104.

Also, as described herein, it may occur that one or more of a number of the business applications 118 may need to communicate with one or more of a number of the system monitors 136, and vice-versa. Similarly, the service mapper 132 may need to communicate with a particular one (or more) of the service monitor(s) 136, in order to perform a desired mapping functionality. Thus, the message transport system 150 may serve as an intermediary and/or layer of abstraction between the system monitor(s) 136 and the business application(s) 118/service mapper 132. For example, rather than communicate directly with one of the system monitor(s) 136, the business application(s) 118 may communicate with the message transport system 150, so that the business application(s) 118 need not know certain levels of details regarding the identity or operation of the relevant system monitor 136 that is being used.

Figure 2:
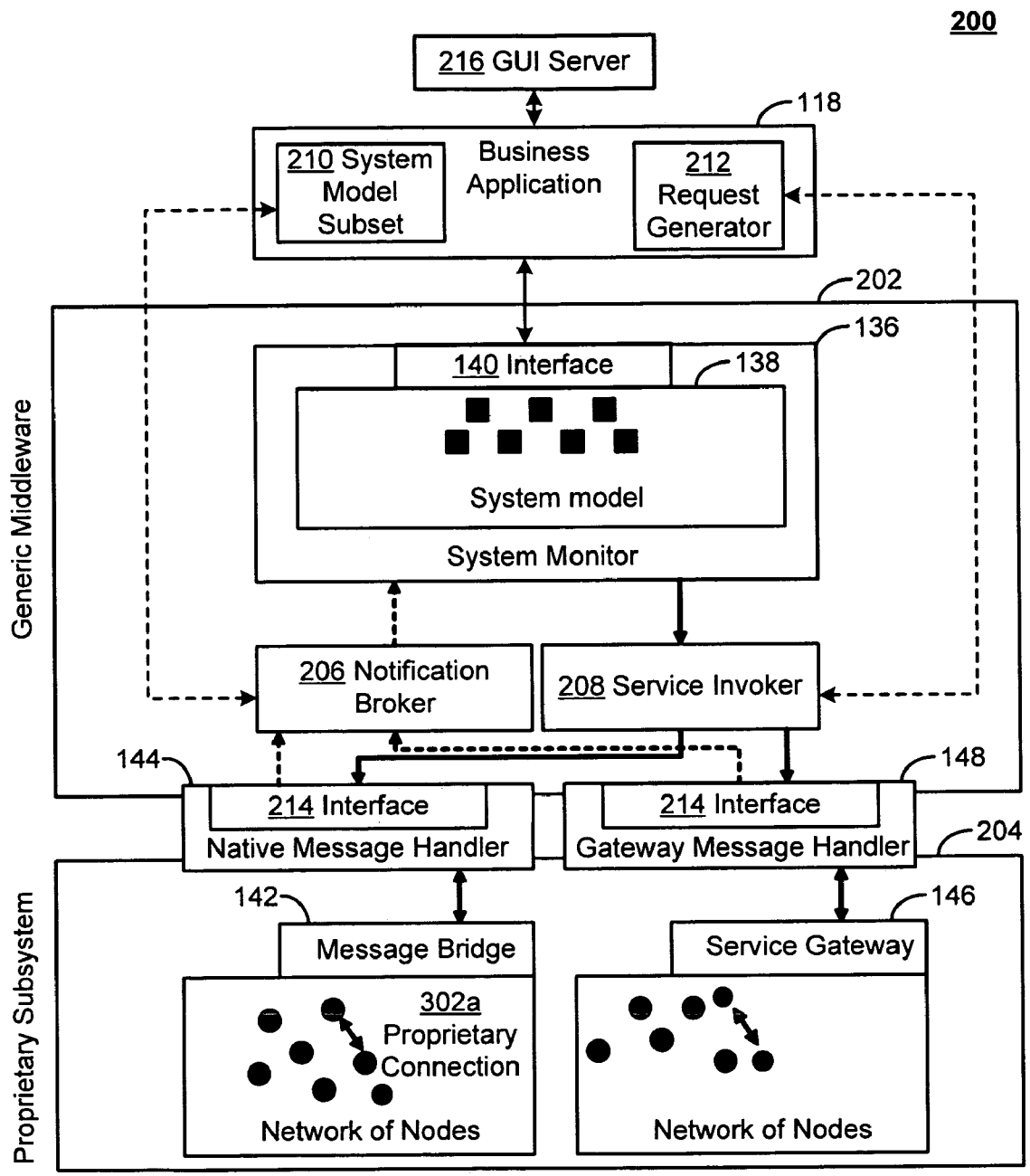
FIG. 2 is a block diagram of additional or alternative implementations of the monitoring system of FIG. 1.

FIG. 2 is a block diagram of a system 200 illustrating additional or alternative implementations of the monitoring system 100 of FIG. 1. In the example of FIG. 2, a generic middleware 202 is illustrated that may be understood to include, or be associated with, many of the components shown in the environment of the computer 145 of FIG. 1. More generally, the generic middleware 202 provides monitoring capability for a number of different proprietary subsystem(s) 204, so that the business application 118 may receive monitor data related to the proprietary subsystems 204 in an easy, convenient, and reliable fashion. The business application 118 receives the monitor data, even though the proprietary subsystems 204 may execute proprietary hardware and/or software platforms (e.g., proprietary communications protocols), simply by communicating with the interface 140 to the system monitor 136.

The generic middleware 202 includes a notification broker 206 and a service invoker 208. The notification broker 206 is configured to determine events and/or messages associated with the native message handler 144 and/or the gateway message handler 148, and to forward corresponding messages to the system monitor 136 (possibly from among, as explained above, a plurality of system monitors).

The events may be related to topics associated with a subscription of the system monitor 136 and/or the business application 118. For example, the notification broker 206 may be considered to be a component of the message transport system 150, and may forward notification messages, in a generic event format (as described in more detail, below) to the appropriate system monitor 136, based on a content of the message(s), e.g., relative to an event that caused the message and/or to a topic of which the message is a part. For example, similarly to the examples above, the sensor network 102 may generate a temperature detection message (e.g., providing information that a temperature exceeds a desired maximum value), and may generate a message that is then sent to the message bridge 142, which forwards a corresponding message to the native message handler 144.

The native message handler 144 may then forward a corresponding event to the notification broker 206. Based on a content of the event, the notification broker 206 may determine one or more subscribers to a topic associated with the event. For example, the system monitor 136 may subscribe to the topic "temperature-related events" with the notification broker 206, and may thus receive the relevant messages for use in updating the system model 138 accordingly. Then, the business application 118 may subscribe to the system monitor 136, using the interface 140, to receive information about (e.g., updates of) the system model 138.

In this regard, the business application 118 may include, or be associated with, a system model subset 210 that represents a subset of the system model 138 of the system monitor 136. For example, the system model 138 and the system monitor 136 may generally be related to "safety monitor data," where such safety information may include, for example, excess temperature events, excess acceleration events, or event potential intruder alerts. All such safety monitor data 210 may thus be incorporated into the system model 138.

The business application 118, however (or an operator thereof), may only be concerned with a subset of this information, e.g., the temperature-related information, and so the business application 118 may access the interface 140 only for the purpose of receiving (e.g., passively receiving through the use of message and event-notification) information for, and constructing, the system model subset 210. Moreover, once the business application 118 has established such a subscription to the system monitor 136, so that characteristics of the system model subset 210 are defined, the business application may thereafter subscribe directly to the related events/messages from the notification broker 206, for updating of the system model subset 210.

Thus, for example, the business application 118 may request only that monitor data associated with devices that match certain criteria, e.g., devices in a certain spatial location/region, or having a certain identifier range, or based on types of sensed environmental data (in other words, a breadth of information requested may be limited by selecting a subset of observable devices/services). In other examples, the business application 118 may request all monitor data that is available per observable device/service, but may request a restriction by type, e.g., may request only the latest temperature readings or static hardware configuration (in other words, a depth of information received about each service/device may be reduced).

As also referenced above, once the business application 118 has initially obtained the requested subset 210 of the system model 138, using the interface 140, the business application 118 may subscribe only to changes of the system model 138 and/or the system model subset 210. In other words, the business application 118 may be notified by the system monitor 136 only of any changes concerning the subset 210, e.g., if a selected node(s) disappears, or a new node fulfilling the specified criteria appears and is connected. Moreover, by sending only the changes to the business application 118, an amount of data sent from the system monitor 136 to the application 118 may be appreciably reduced.

The service invoker 208 may be used to invoke requests or commands on the sensor networks 102, 104. For example, the system monitor 136 may periodically issue a query or request to the service invoker 208, or a user of the business application 118 (or the business application 118 itself) may use a request generator 212 to invoke a request onto the sensor networks 102, 104. That is, the request generator 212 of the business application 118 may generate a request for appropriate service instances to which the service invocation may be sent, and then use the service invoker 208 by way of the message transfer system 150. Examples of such service invocations are provided in more detail, below, e.g., with respect to FIG. 7. Then, thereafter, the business application 118 may communicate directly with the service invoker 208 to request updates to the system model subset 210.

In FIG. 2, all of the handlers 144, 148 may present a standard discoverable interface(s) 214, so that the system monitor 138, using (in the example of FIG. 2), the notification broker 206 and the service invoker 208, may communicate with any and all of the available message handlers, using one or more common or standard protocols. The message handlers 144, 148 may then translate and/or pass through the commands to the message bridge 142 or the service gateway 146, respectively. Accordingly, it may be understood that the system monitor 136 may monitor a wide variety of software and hardware platforms, and may provide obtained monitor data in a manner that is useful to the business application 118 (or to an operator thereof).

For example, the business application 118 may forward information from, or otherwise provide access to, the system model subset 210. Then, a graphical user interface (GUI) server 216 may be used to provide the system model subset 210, or otherwise allow the business application to display or otherwise provide results of operations of the system monitor 138 (and/or of the generic middleware 202 as a whole). For example, the GUI server 216 may provide a management console that allows a user of the business application 118 to input queries and/or receive results of queries. Although shown in communication with the business application 118, the GUI server 216 also may communicate directly with the system monitor 136, or may be otherwise configured, as would be apparent.

Figure 3:
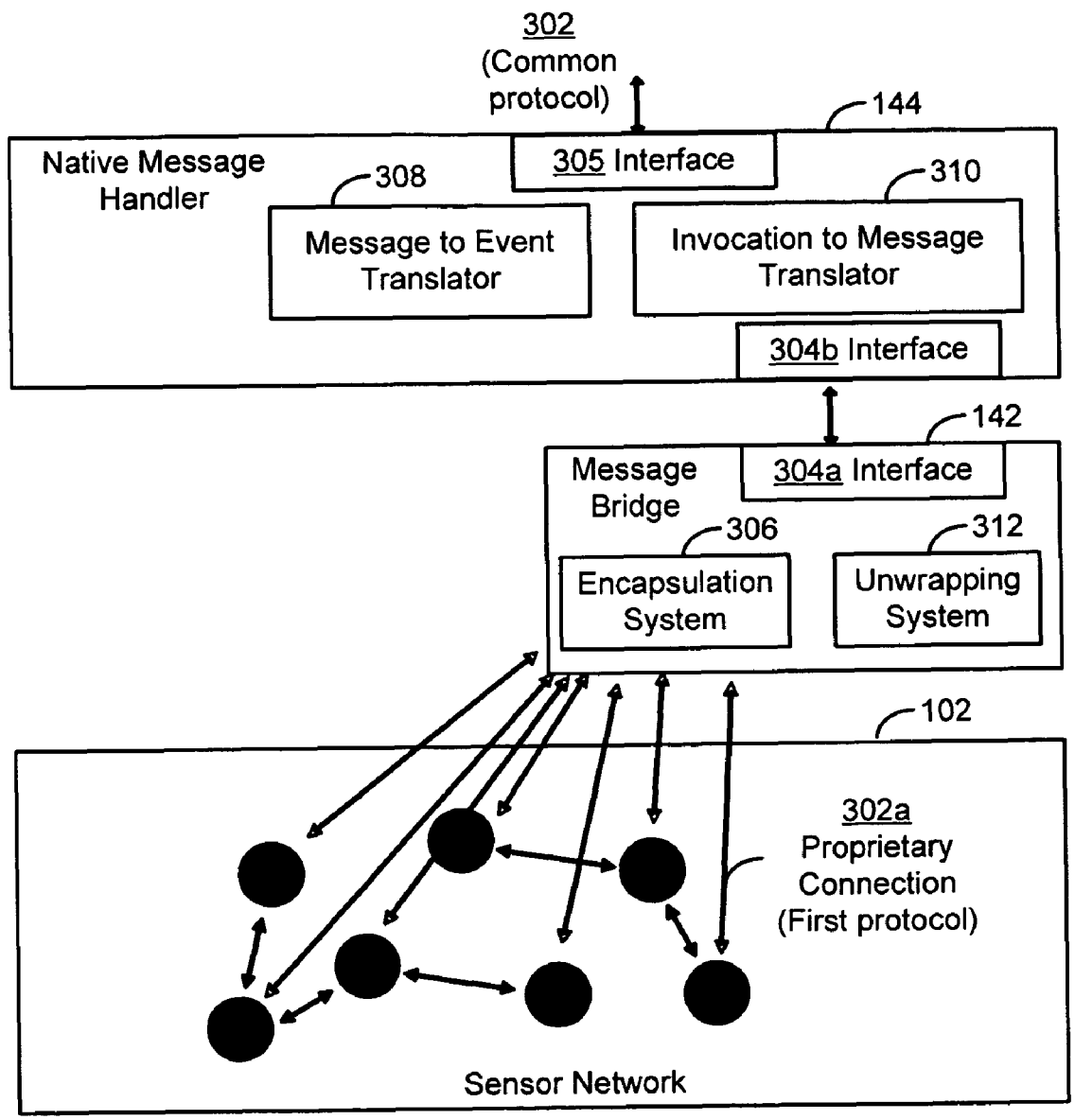
FIG. 3 is a block diagram of a first example of message handling components used in the systems of FIGS. 1 and/or 2.

FIG. 3 is a block diagram of a first example of message handling components used in the system of FIGS. 1 and/or 2. Specifically, FIG. 3 illustrates an example of the native message handler 144 and its associated message bridge 142.

As described above with respect to FIGS. 1 and 2, use of the message bridge 142 allows sending and receiving messages in a proprietary, platform-dependent format 302a, to and from a network of nodes, e.g., the sensor network 102, in the same format 302a that the nodes/devices use to communicate with each other, as shown. The message bridge 142 includes a standard interface 304a, for, for example communicating over an Ethernet or a serial connection, to forward messages from the sensor network 102.

Thus, as already described, the message bridge 142 may be hardware (e.g, computing device) in a vicinity of the sensor network 102 and configured to communicate therewith, e.g., wirelessly, to exchange messages. The message bridge 142 may include an encapsulation system 306 that is configured to encapsulate the messages in the proprietary, platform-dependent protocol for transmission over standard protocols, using the interface 304a. For example, the encapsulation system 206 may encapsulate the platform-specific messages and send them as payload over a standard protocol, such as UDP over Ethernet, or a serial connection, and/or using the Transmission Control Protocol (TCP).

The native message handler 144 receives the encapsulated message over the standard connections/protocols, using a corresponding interface 304b on its side. Then, a message to event translator 308 may be configured to unpack, analyze, and convert the proprietary messages to a generic event format, e.g., as mentioned above, using a common or standard communications protocol 302. That is, the generic event format may be a format that is configured for sending over (and receiving over) an interface 305, using the common communications protocol 302, so as to be understood and usable by the message transport system 150 and/or the notification broker 206.

Further in communicating with the message transport system 150 and/or the service invoker 208, the native message handler 144 may receive a message in the generic event format just referenced, e.g., using the common communications protocol 302. For example, the native message handler 144 may receive an invocation from the service invoker 208 to forward a query for collection of a response, e.g., to determine a most-recent temperature reading, or to determine a current utilization of a processor or memory of a device(s) in the sensor network 102, or to determine a number and type of services running on such a device.

In this case, the native message handler 144 may include an invocation-to-message translator 310 that creates a proprietary, platform-dependent message that causes the relevant service invocation in the sensor network 102. For example, the message handler 144 may be configured to use a proprietary, platform-dependent discovery method to discover the devices/nodes and services in the sensor network 102. The translator 310 may then wrap or encapsulate this message and forward using the interface(s) 304a, 304b to the message bridge 142.

Accordingly, the message bridge 142 receives the encapsulated message over the standard protocol associated with the interface 304a at an unwrapping system 312. The unwrapping system 312 may then forward the unwrapped (i.e., encapsulation removed) message to device(s) of the sensor network 102, using the appropriate proprietary, platform-dependent protocol 302a.

Thus, it may be seen from the above examples that, in order to keep the system model 138 up-to-date, the system monitor 136 may obtain state information originating from devices of the sensor network 102 (or 104). The system monitor 136 may not be able to communicate directly with these devices (e.g., the devices of the sensor network 102), due to their use of the proprietary protocol 302a to communicate with each other. Therefore, as just described, the message bridge 142 and the native message handler 144 may be configured to expose the desired state information.

Implementations and instances of the native message handler 144 and the message bridge 142 may be constructed and used for each situation in which a sensor network uses a different proprietary, platform-dependent protocol, such as the protocol 302a, and for which no other solution may exist for integrating the sensor networks 102, 104, or other networks.

Figure 4:
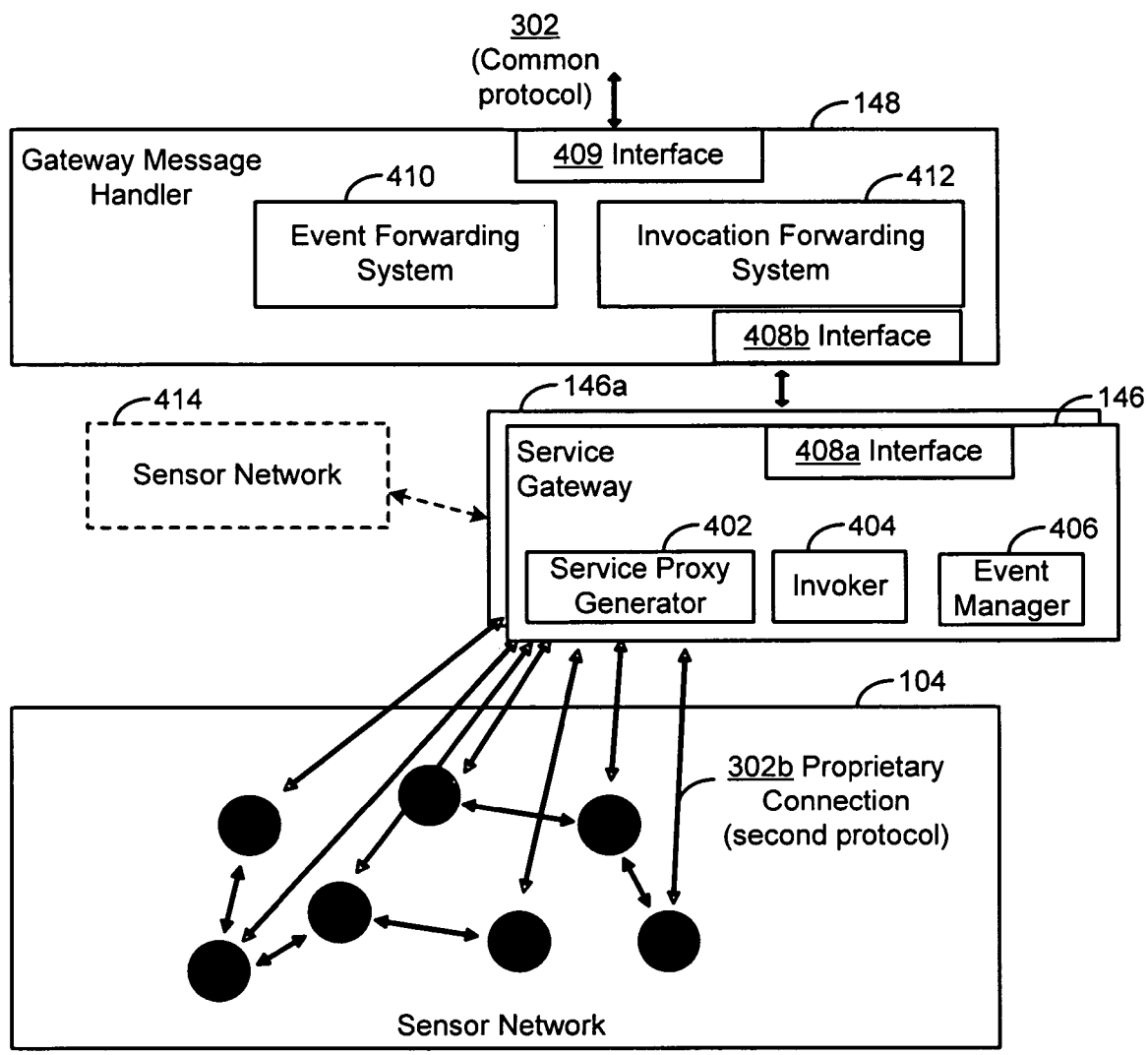
FIG. 4 is a block diagram of a second example of message handling components used in the systems of FIGS. 1 and/or 2.

On the other hand, other solutions may exist. For example, rather than using the message bridge 142, the service gateway 146 may be used, along with the gateway message handler 148, as shown in FIGS. 1 and 4. In this case, the service gateway 146 and the gateway message handler 148 may represent another example of interface components used in exposing network state information to the system monitor 136. Differences between the two sets of interface components (i.e., message bridge 142/native message handler 144 and service gateway 146/gateway message handler 148), and other types/examples of interface components, may exist with respect to an amount and distribution of offered functionality.

For example, FIG. 4 is a block diagram of a second example of message handling components used in the system of FIGS. 1 and/or 2. More specifically, FIG. 4 is a block diagram illustrating an example of the service gateway 146 and the gateway message handler 148.

In the example of FIG. 4, the service gateway 146 is configured to provide discovery of devices/nodes of the sensor network 104, as well as (if applicable) services in the sensor network 104. For example, the service gateway 146 may include a proxy generator 402 that is configured to provide a proxy for each device/node and/or each service that is present within the sensor network 104. That is, the proxy generator 402 may generate a discoverable service(s) for each device or service of the sensor network 104.

In this case, the service gateway 146 may periodically or continuously run queries or otherwise communicate with the devices of the sensor network 104, using a second, proprietary, platform-dependent protocol 302b, so that the proxy generator 402 may periodically or continuously update the generated proxies with current information about the sensor network 104. For example, the service gateway 146 may implement an invoker 404 that invokes services and/or transmits queries to the sensor network 104, and an event manager 406 that receives events from the sensor network 104. It should be understood that the event manager 406 may receive events that are generated in response to invocations of the invoker 404, or may receive events that are auto-generated by devices of the sensor network 104 (e.g., where such a device is configured to output a sensor reading at defined intervals). Thus, the proxy generator 402 provides a medium for providing and capturing invocations and events. For example, the proxy generator 402 may determine and update the relevant proxies, in response to an event associated with the event manager 406.

The proxies may be implemented as services that may be discovered by the gateway message handler 148 using a standard discovery mechanism, such as, as mentioned above, web service discovery. Of course, other standard discovery techniques, such as, for example, web service discovery techniques, JINI discovery, and/or UPnP discovery, also may be used. In this way, the gateway message handler 148 may discover the proxies, using interfaces 408a, 408b and standard discovery techniques, instead of having to do a platform-proprietary discovery.

Moreover, the gateway message handler 148 is relieved, at least to an extent, of the type of protocol translation(s) described above with respect to the native message handler 144. Instead, an event forwarding system 410 may be employed that is configured to receive events from the service gateway 146, and to forward such events, e.g., to the message transport system 150 and/or the notification broker 206, using an interface 409 that is the same as, similar to, or of the same type as, the interface 305 of the native message handler 144. For example, as shown, and as discussed above, the gateway message handler 148 may communicate with the message transport system 150 and/or the notification broker 206 using the (at least one) common communications protocol 302.

Conversely, but similarly, the gateway message handler 148 may include an invocation forwarding system 412 that is configured simply to forward invocations, e.g., from the service invoker 208, and using the common communications protocol 302 and the interface 409, to the service gateway 146. That is, as described above, the service gateway 146 itself, e.g., the proxy generator 402, may itself interact with a monitor or manager component on devices of the sensor network 104 (conceptually similar to the monitor service 137 of the device 110), or otherwise may collect monitor data from the devices of the sensor network 104, so that the proxies of the service gateway 146 are kept up-to-date, and have current information available for the gateway message handler 148 and the system monitor 136.

Nonetheless, it may generally be the case that the proxy generator 402 will not be able to maintain all available monitor information associated with the sensor network 104 that may be desired by, or useful to, the system monitor 136. Accordingly, the system monitor 136, using, e.g., the service invoker 208, may forward an invocation to the service gateway 146, by way of the invocation forwarding system 412 (and the interface 408) of the gateway message handler 148. Then, the invoker 404 of the service gateway 146 may communicate with the sensor network 104, using a protocol of the sensor network 104, to obtain the desired reading (e.g., a number of the devices of the sensor network 104 running a particular service), which may then be reflected by the proxy generator 402 in the proxies of the service gateway 146. Thus, the service gateway 146 is configured to perform service/device discovery for the sensor network 104, even when the discovery requests originate from the system monitor 136.

In short, then, the service gateway 146 provides a translation of messages to/from the sensor network 104, as well as providing a higher level service(s), e.g., the proxies of the proxy generator 402, to give a comprehensive view of which services and/or which devices are present in the sensor network 104, and to do so in a service-oriented way.

As may be appreciated, one advantage of the service gateway 146 and the gateway message handler 148 is that only one gateway message handler 148 may be needed for any platform that offers the service gateway 146. For example, a second service gateway 146a may be associated with a sensor network 414, and may expose proxies to the gateway message handler 148 in the same service-oriented way as the service gateway 146, using the interface 408b of the gateway message handler 148.

Figure 5:
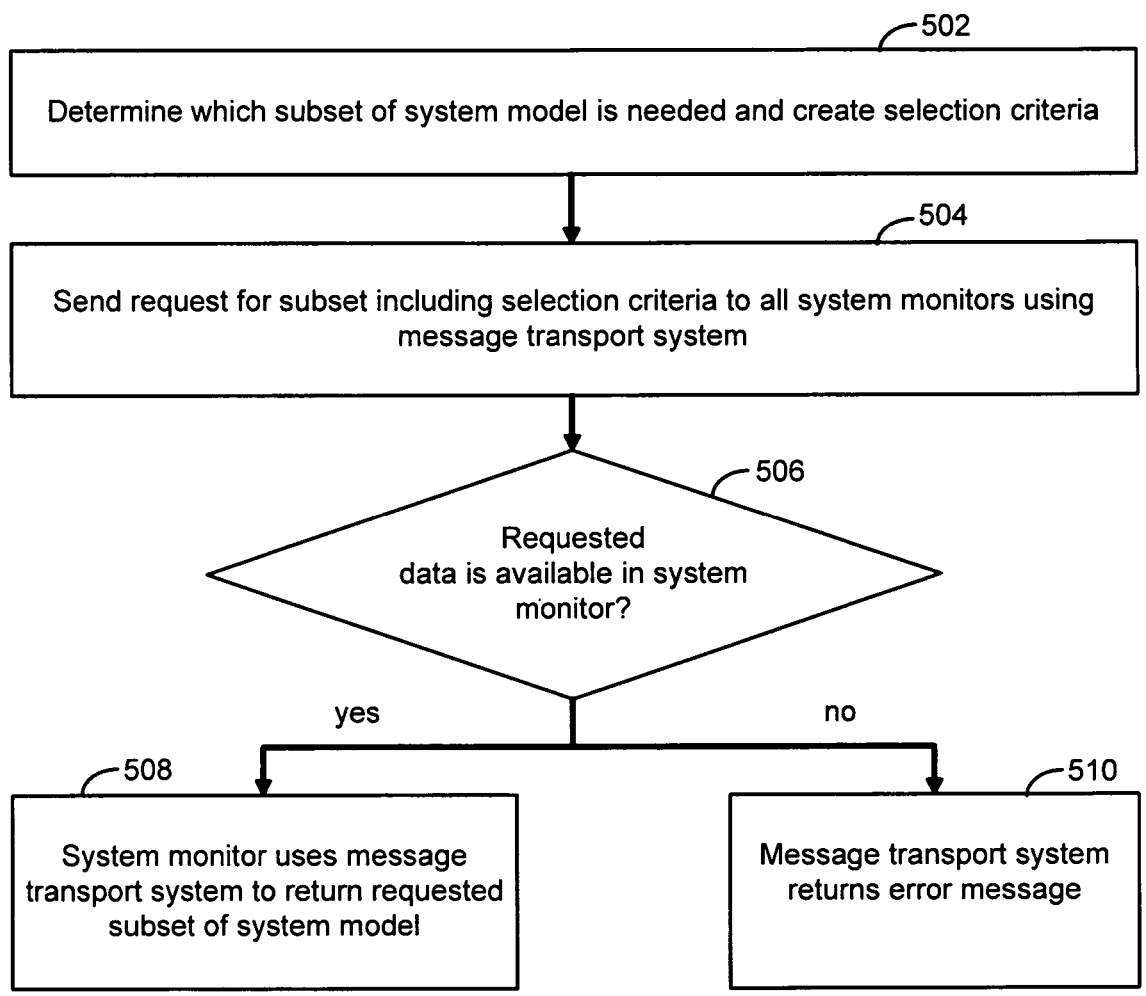
FIG. 5 is a flowchart illustrating first example operations of the systems of FIGS. 1-4, in which a system state is requested.

FIG. 5 is a flowchart 500 illustrating first example operations of the systems of FIGS. 1-4, in which a system state is requested. For example, as described above, the business application(s) 118 may request state information about a current state of the sensor network(s) 102, 104. Such state information may include, for example, a status of the devices 106-116 of the sensor networks 102, 104, or information about which services are present on which of the devices 106-116, or may include sensed information (e.g., temperature data) that may be desired by the business application(s) 118.

In this case, the business application 118 or other component may initially determine which subset of the system model 138 is needed, and may create a corresponding selection criteria (502). For example, as shown in FIG. 2, the business application 118 may determine, request, or specify desired characteristics of the system model subset 210.

A request may then be sent for the subset, including the selection criteria, to all of the system monitors 136, using, e.g., the message transport system 150 (504). For example, the business application 118 need not be aware, at least initially, of which of the system monitors 136 is available for providing the desired service information, or other state information. The message transport system 150 may thus be used to send the request to all of the system monitors 136, so that, if the requested data is available in at least one of the system monitors 136 (506), then the corresponding system monitor 136 may use the message transport system 150 to return the requested subset (e.g., the subset 210) of the system model 138 (508). If the requested data is not available in at least one of the system monitors 136, then the message transport system 150 may return a corresponding error message to indicate that the desired system state is not available (510).

Using the techniques described herein, including the operations of FIG. 5, business applications 118 and/or the service mapper 132, or other services or applications, may quickly and easily obtain (desired portions of) the system model 138, since the desired system model 138 may be available even before the request is received. Further, by having built the system model 138 over time, it may be understood that a quantity of messages within and among the various middleware and device-level systems may be spread over a period of time, so that detailed system models may be provided quickly, while avoiding a flooding and/or overwhelming of the various communications links/channels.

Figure 6:
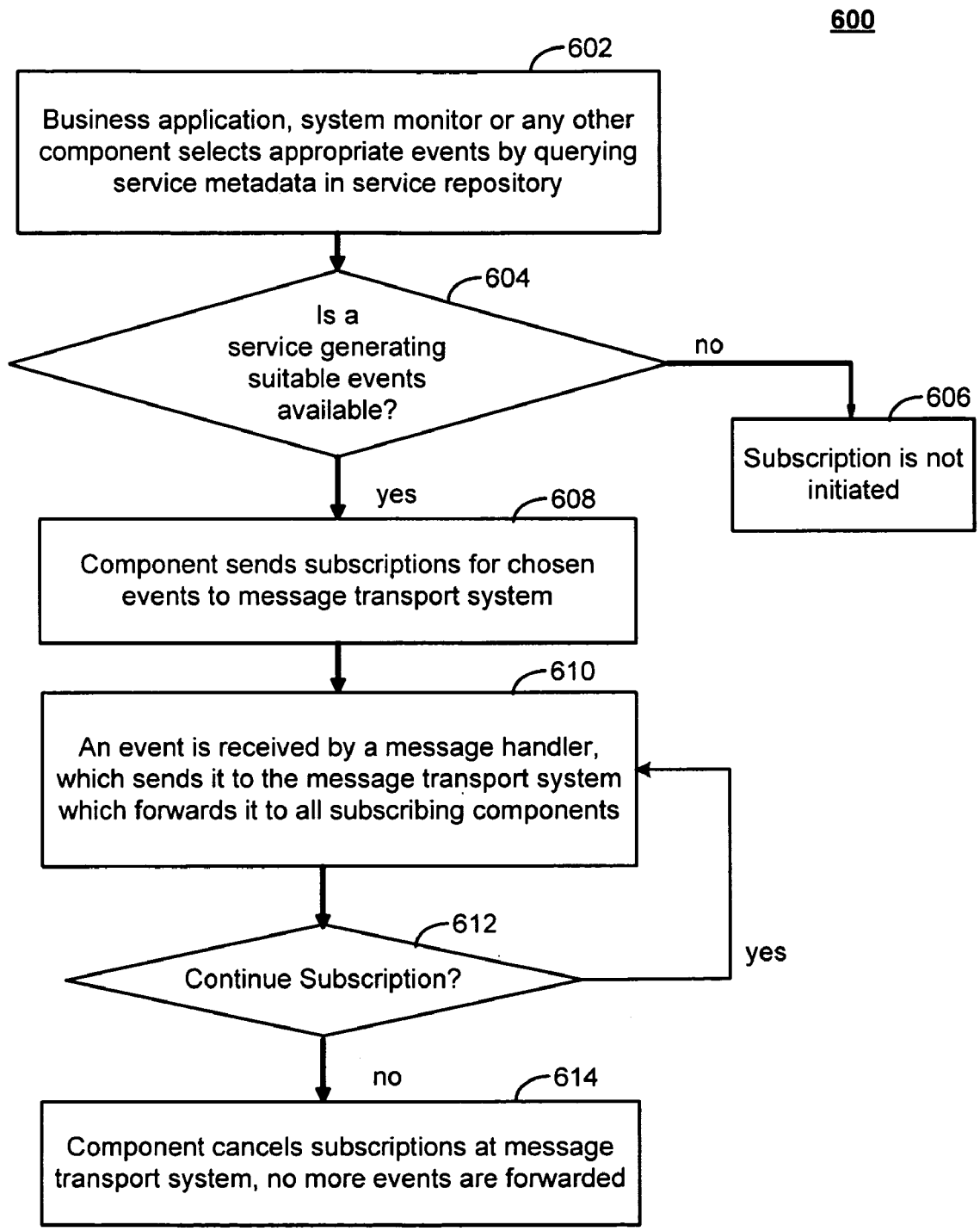
FIG. 6 is a flowchart illustrating second example operations of the system of FIG. 1-4, in which event subscriptions are created and managed.

FIG. 6 is a flowchart 600 illustrating second example operations of the system of FIG. 1-4, in which event subscriptions are created and managed. As described above, the provision of subscriptions, e.g., to the business applications 118, allows the business application 118 to receive information about desired/specified events of the systems 100/200, without having to actively request a current system state of the networks 102, 104 and of the system monitor 136.

In the example of FIG. 6, the business application(s) 118, system monitor 136, and/or virtually any other system component may select or specify desired events, by, e.g., querying the service metadata 124 within the service repository 126 (602). If a service generating suitable events is not available (604), then the subscription is not initiated (606). For example, if the business application 118 seeks temperature data, among other criteria, then a service generating events related thereto may be determined.

If such a service is available (604), then the component (e.g., the business application 118) may send a subscription for chosen events to the message transport system 150 (608). Then, a corresponding event may be received at one of the message handlers 144, 148, so that the event may be forwarded to the message transport system 150 for forwarding to all subscribing components (610). Of course, in so doing, the various techniques described herein for operation(s) of the message handlers 144, 148 (e.g., message to event translation 308 at the message handler 144) may be used.

If the subscription to the event(s) is to be maintained (612), then the operation(s) of receiving and forwarding the relevant events may be continued (610). Otherwise, if the subscription is not to be continued (612), then the originally-requesting components (e.g., the business application 118) may cancel the subscription at the message transport system 150, in which case the message transport system 150 may decrease or cease the forwarding of related events to the component(s) (614).

Figure 7:
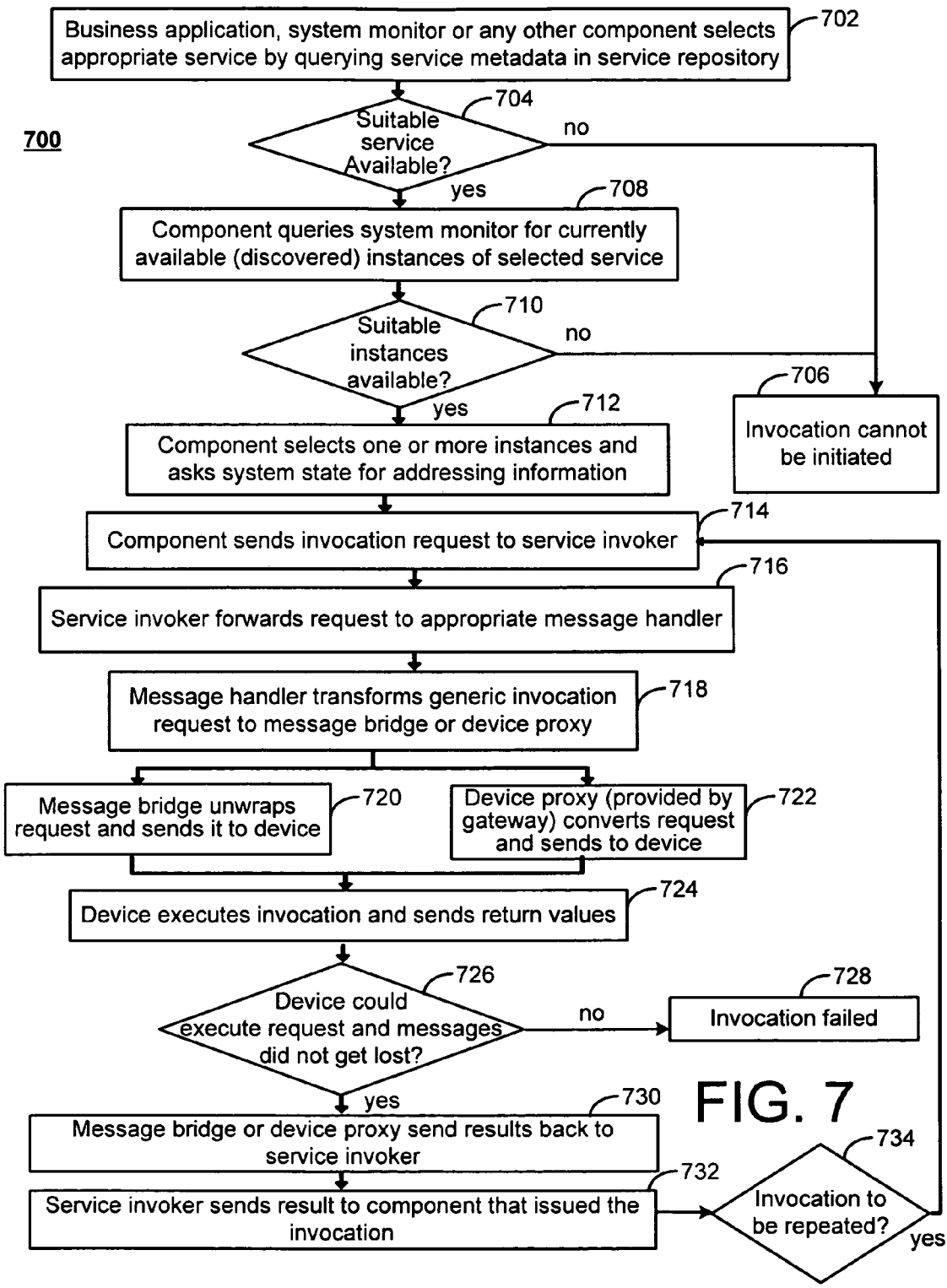
FIG. 7 is a flowchart illustrating third example operations of the system of FIG. 1-4, in which services are invoked.

FIG. 7 is a flowchart 700 illustrating third example operations of the system of FIG. 1-4, in which services are invoked. That is, as described above, it may be necessary or desirable for the business application 18 or other component(s) to invoke an action or instance of the service executables 128, so as, for example, to obtain a value (e.g., a sensed value of a specified parameter, such as temperature) that is obtainable by the specified service, but that is not currently available within the system model 138.

Accordingly, a business application 118, system monitor 136, and/or virtually any other system component of the system 100 and/or 200 may determine or select a desired service, e.g., by querying the service metadata 124 within the service repository 126 (702). If a suitable service is not available (704), then the service invocation may fail to be initiated (706). If, however, a suitable service is available (704), then the component (e.g., the business application 118) may select such a service and then query the system monitor 136 to determine currently-available instances of the selected service (708). If such a suitable instance of the specified service is not available (710), then, again, the service invocation may fail (706). If, however, such a suitable instance is available (710), then the component may select one or more thereof, and may access a current system state (as described above, e.g. with respect to FIG. 5) to determine appropriate addressing information for the service instance and possibly the device on which the service instance will run.

Once a suitable service and service instance have been determined, and corresponding addressing information obtained therefor, then the component may send the desired service invocation (request) to the service invoker 208 (714), for forwarding of the request to a determined message handler 144, 148 (716). For example, a request for the returned values (or other monitor data) in a common protocol may be generated, e.g., using the common communications protocol 302, e.g., UDP and/or UPnP.

As appreciated from the above description, the message handler 144, 148 may be configured to transform the generic invocation of the service invoker (718) into a format compatible with a corresponding message bridge 142 (in the case of the native message handler 144) or into a device proxy (in the case of the gateway message handler 148).

In the case of the native message handler 144, then, the invocation-to-message translator 310 may translate the invocation (event) into a message and wrap/encapsulate the message for forwarding to the message bridge 142. The message bridge 142 may then unwrap, using unwrapping system 312, the message, and may then forward to the device(s) 106-108 (720) using the proprietary language/protocol 302a of the devices. With regard to the gateway message handler 148, a device and/or service proxy of the gateway message handler 148 may be used to convert the request into the necessary format for communication with the devices of, in the present case, the sensor network 104 (722), by way of the service gateway 146.

Accordingly, the device receiving the invocation may execute the invocation and send return values (e.g., monitor data, including, for instance, location or temperature information) (724). If the device was not able to execute the request, and/or messages were lost during the transmission process (e.g., between the devices 106-110 of the sensor network 102) (726), then the service invocation may fail (728). Otherwise, the message bridge 142 and/or the service gateway 146 may send the gathered results back to the service invoker 208 (730), so that the service invoker 208 may forward the result (e.g., sensed values) to the component that caused the invocation in the first place (732). If invocation(s) are to be repeated (734), then the process 700 may continue with the same or different component sending another invocation request to the service invoker 208 (714), as already described.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system at least one processor; comprising:
a non-transitory computer readable medium storing instruction and executable by the processor, further comprises a first message handler and a second message handler, wherein the first message handler configured to receive first monitor data associated with a first sensor network using a first service interface, the first sensor network using a first communications protocol;
the second message handler configured to receive second monitor data associated with a second sensor network using a second service interface, the second sensor network using a second communications protocol;
a message transport system configured to receive the first monitor data and the second monitor data using a third service interface, and further configured to route the first monitor data and the second monitor data in a common protocol, based on content thereof; and
a system monitor configured to receive the first monitor data and the second monitor data from the message transport system using a fourth service interface, in the common protocol and based on the routing, and further configured to generate a system model describing the first sensor network and the second sensor network, based on the first monitor data and the second monitor data,
wherein the system monitor is configured to expose the system model to at least one application, using a fifth service interface, and
wherein the first and second sensor networks include devices and associated sensors, and wherein at least some of the devices in each of the first and second sensor networks are each configured to execute at least one sensor service to control an operation of corresponding sensors and thereby execute a collaborative sensor function with respect to sensed environmental data collected by the sensors, and wherein the first message handler and the second message handler are configured to make the at least one sensor service discoverable to the at least one application within the first or second monitor data, to thereby enable queries from the at least one application regarding the sensor services, using the message transport system and the system monitor.

2. The system of claim 1 wherein the first message handler comprises:
a native message handler in communication with a message bridge to receive the first monitor data, the message bridge being in communication with at least one device of the first network using the first communications protocol,
wherein the native message handler is configured to translate the first monitor data from the first communications protocol to the common communications protocol.

3. The system of claim 2 wherein the message bridge is configured to encapsulate the first monitor data in the first communications protocol for transmission thereof to the native message handler.

4. The system of claim 2 wherein the second message handler comprises:
a gateway message handler in communication with a service gateway to receive the second monitor data, the service gateway being in communication with at least one device of the second network and being compatible with the second communications protocol,
wherein the gateway message handler is configured to receive the second monitor data in the common communications protocol from the service gateway for forwarding to the message transport system.

5. The system of claim 4 wherein the service gateway is configured to provide service proxies representing devices and/or services of the second network, and wherein the service proxies are discoverable to the second message handler.

6. The system of claim 1 wherein the message transport system is configured to select the system monitor from among a plurality of system monitors for routing the first monitor data and/or the second monitor data thereto, based on content of the first monitor data and/or the second monitor data.

7. The system of claim 1 wherein the system monitor is configured to provide a request for additional monitor data, and wherein the message transport system is configured to select the first message handler and/or the second message handler for forwarding to the first network or the second network, respectively, based on content of the request.

8. The system of claim 1 wherein the message transport system is configured to route the first monitor data and the second monitor data in a common protocol, based on content thereof, including receiving a subscription from the system monitor for messages having subscribed content, and wherein the message transport system comprises
a notification broker configured to receive messages originating from both the first monitor data and the second monitor data and having the subscribed content, and configured to detect the subscribed content within the messages and to publish the messages to the system monitor and/or to an application requesting at least a subset of the system model that corresponds to the subscribed content.

9. The system of claim 8 wherein the message transport system comprises:
a service invoker that is configured to:
receive a request for additional monitor data,
select the first sensor network as being configured to provide the additional monitor data, based on a content of the request, and
forward the request to the first message handler using the common communications protocol, for communication to the first sensor network using the first communications protocol.

10. The system of claim 1 wherein the first monitor data and/or the second monitor data includes one or more of device metadata about one or more devices in the first and/or the second sensor network, aggregated device metadata, service metadata related to the at least one sensor service running on one or more devices of the first and/or the second sensor network, aggregated service data, network data associated with the first sensor network or the second sensor network, or sensor values collected in association with the one or more devices.

11. A method comprising:
receiving first monitor data at a first message handler associated with a first sensor network using a first service interface, in an encapsulated data packet including the first monitor data therein, using a first communications protocol that is used by the first sensor network;

translating the first monitor data from the first communications protocol to a common communications protocol;

receiving the first monitor data at a message transport system that is configured to forward the first monitor data to a system monitor in the common communications protocol;

receiving, using a second service interface, second monitor data at the message transport system from a second message handler associated with a second sensor network, in the common communications protocol;

routing the first monitor data and the second monitor data to a system monitor configured to monitor a state of the first sensor network and/or the second sensor network; and updating a system model providing the state of the first sensor network and/or the second sensor network, based on the first monitor data and the second monitor data, wherein the first monitor data and the second monitor data are received at the message transport system using a third service interface, and provided to the system monitor using a fourth service interface, and wherein the system model exposes the state of the first sensor network and/or the second sensor network to at least one application, using a fifth service interface, and wherein the first and second sensor networks include devices and associated sensors, and wherein at least some of the devices in each of the first and second sensor networks are each configured to execute at least one sensor service to control an operation of corresponding sensors and thereby execute a collaborative sensor function with respect to sensed environmental data collected by the sensors, and wherein the first message handler and the second message handler are configured to make the at least one sensor service discoverable to the at least one application within the first or second monitor data, to thereby enable queries from the at least one application regarding the sensor services, using the message transport system and the system monitor.

12. The method of claim 11 comprising:
receiving a request from the at least one application for at least a subset of the system model; and
providing the at least the subset of the system model to the at least one application.

13. The method of claim 11 wherein routing the first monitor data and the second monitor data to a system monitor comprises:
determining the system monitor from among a plurality of system monitors, based on content of the first monitor data and/or the second monitor data.

14. A system a non-transitory computer-readable medium storing instructions comprising comprising:
a plurality of message handlers, each message handler associated with at least one sensor network in which a plurality of devices are configured to communicate wirelessly with one another using a platform-dependant communications protocol, wherein each of the plurality of message handlers is configured to communicate with its corresponding at least one sensor network using a corresponding message handler service interface;

a plurality of system monitors configured to collect monitor data related to the at least one sensor network from the plurality of message handlers, each system monitor including a monitor service interface and configured to provide a system model representing state information about the corresponding at least one sensor network to at least one application; and a message transport system configured to route messages related to the monitor data between the plurality of system monitors and the plurality of message handlers, based on content of the messages and using corresponding messaging service interfaces, and wherein the at least one sensor network includes devices and associated sensors, and wherein at least some of the devices are each configured to execute at least one sensor service to control an operation of corresponding sensors and thereby execute a collaborative sensor function with respect to sensed environmental data collected by the sensors, and wherein the plurality of message handlers are configured to make the at least one sensor service discoverable to the at least one application within the monitor data, to thereby enable queries from the at least one application regarding the sensor services, using the message transport system and the plurality of system monitors.

15. The system of claim 14 wherein the plurality of message handlers comprise:
a native message handler that is configured to communicate with a message bridge positioned in a vicinity of an associated sensor network, and further configured to translate messages exchanged with the message bridge between at least one common communications protocol used by the native message handler, the message transport system, and the system monitor, and at least a first platform-dependant communications protocol used by the associated sensor network and the message bridge.

16. The system of claim 14 wherein the plurality of message handlers comprise:
a gateway message handler that is configured to communicate with a service gateway positioned in a vicinity of an associated sensor network, and further configured to forward messages exchanged with the service gateway using at least one common communications protocol used by the gateway message handler, the message transport system, the system monitor, and the service gateway, and at least a first platform-dependant communications protocol used by the associated sensor network and the service gateway.

17. The system of claim 14 wherein the message transport system includes a notification/invocation mechanism configured to publish the monitor data to at least one of the system monitors, and further configured to invoke requests for the monitor data at least one of the plurality of message handlers.

18. The system of claim 14 wherein at least one of the plurality of system monitors is configured to publish at least a subset of an associated system model to the at least one application, based on a subscription of the at least one application with corresponding system monitor of the plurality of system monitors, using the corresponding monitor service interface.

* * * * *